United States Patent
Zhang et al.

(10) Patent No.: US 12,113,742 B2
(45) Date of Patent: Oct. 8, 2024

(54) BEAM FAILURE RECOVERY METHOD AND DEVICE, BEAM FAILURE RECOVERY PARAMETER DETERMINATION METHOD AND DEVICE, QUASI COLOCATION REFERENCE SIGNAL DETERMINATION METHOD AND DEVICE, AND STORAGE MEDIUM

(71) Applicant: ZTE CORPORATION, Shenzhen (CN)

(72) Inventors: Shujuan Zhang, Shenzhen (CN); Zhaohua Lu, Shenzhen (CN); Xiyu Wang, Shenzhen (CN); Bo Gao, Shenzhen (CN); Yijian Chen, Shenzhen (CN); Yu Ngok Li, Hong Kong (CN); Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 443 days.

(21) Appl. No.: 17/598,784

(22) PCT Filed: Mar. 30, 2020

(86) PCT No.: PCT/CN2020/082032
§ 371 (c)(1),
(2) Date: Nov. 24, 2021

(87) PCT Pub. No.: WO2020/192786
PCT Pub. Date: Oct. 1, 2020

(65) Prior Publication Data
US 2022/0166581 A1    May 26, 2022

(30) Foreign Application Priority Data
Mar. 28, 2019 (CN) .......................... 201910245684

(51) Int. Cl.
H04L 5/00 (2006.01)

(52) U.S. Cl.
CPC .......... H04L 5/0051 (2013.01); H04L 5/0023 (2013.01); H04L 5/0032 (2013.01)

(58) Field of Classification Search
None
See application file for complete search history.

(56) References Cited

U.S. PATENT DOCUMENTS

| 11,950,113 B2 * | 4/2024 | Zhou ..................... H04B 7/088 |
| 2018/0006770 A1 | 1/2018 | Guo et al. |

(Continued)

FOREIGN PATENT DOCUMENTS

| CN | 109121223 A | 1/2019 |
| CN | 110536436 A | 12/2019 |

OTHER PUBLICATIONS

Huawei et al., "Beam failure recovery procedure", *3GPP TSG RAN WG1 Meeting #93 R1-1807129*, May 25, 2018 (May 25, 2018), section 2.

(Continued)

*Primary Examiner* — Phirin Sam
(74) *Attorney, Agent, or Firm* — Morgan, Lewis & Bockius LLP

(57) ABSTRACT

A method for beam failure recovery includes performing, in response to a non-empty intersection existing among time domain resources corresponding to beam failure recovery processes of N frequency domain bandwidths, any one of the following methods: selecting the beam failure recovery process of one frequency domain bandwidth among the beam failure recovery processes of the N frequency domain bandwidths, performing the beam failure recovery process of the selected frequency domain bandwidth, and terminating or suspending beam failure recovery processes of the unselected frequency domain bandwidths; combining the beam failure recovery processes of the N frequency domain bandwidths into a single beam failure recovery process and (Continued)

---

100

In response to a non-empty intersection existing among time domain resources corresponding to beam failure recovery processes of N frequency domain bandwidths, perform any one of the methods below to perform the beam failure recovery processes of the N frequency domain bandwidth In method one for beam failure recovery, select the beam failure recovery process of one frequency domain bandwidth among the beam failure recovery processes of the N frequency domain bandwidths; perform the beam failure recovery process of the selected frequency domain bandwidth; and terminate or suspend beam failure recovery processes of the unselected frequency domain bandwidths In method two for beam failure recovery, combine the beam failure recovery processes of the N frequency domain bandwidths into one beam failure recovery process and perform the combined beam failure recovery process In method three for beam failure recovery, perform the beam failure recovery processes of the N frequency domain bandwidths concurrently performing the single beam failure recovery process; or performing the beam failure recovery processes of the N frequency domain bandwidths simultaneously. Here N is a positive integer greater than 1.

20 Claims, 5 Drawing Sheets

(56) References Cited

U.S. PATENT DOCUMENTS

| | | | | |
|---|---|---|---|---|
| 2019/0058519 | A1* | 2/2019 | Davydov | H04W 72/21 |
| 2019/0075524 | A1* | 3/2019 | Zhou | H04W 72/046 |
| 2021/0194756 | A1* | 6/2021 | Babaei | H04B 7/088 |
| 2022/0039158 | A1* | 2/2022 | Awadin | H04W 74/0866 |
| 2022/0376769 | A1* | 11/2022 | Xiong | H04B 7/0695 |
| 2023/0328788 | A1* | 10/2023 | Xu | H04L 5/0048 |
| | | | | 370/329 |
| 2024/0023158 | A1* | 1/2024 | Chen | H04W 74/0833 |

OTHER PUBLICATIONS

International Search Report for Application No. PCT/CN2020/082032, dated Jul. 8, 2020, 8 pages including translation.
NEC, "Remaining Issues on Beam Failure Recovery", *3GPP TSG RAN WG1 Meeting #92b R1-1803622*, Apr. 20, 2018 (Apr. 20, 2018), sections 2-4.
QUALCOMM, "Beam failure recovery procedure", *3GPP TSG-RAN WG1 #92B R1-1804788*, Apr. 20, 2018 (Apr. 20, 2018), sections 1-5.
QUALCOMM, "Beam failure recovery procedure", *3GPP TSG RAN WG1 Meeting #93 R1-1807342*, Busan, Korea, May 25, 2018.
VIVO, "Remaining issues on physical downlink control channel", *3GPP TSG RAN WG1 Meeting #94bis R1-1810369*, Chengdu, China, Oct. 8-12, 2018.
Intel, "On Beam Management Enhancement", *3GPP TSG RAN WG1 Ad-Hoc Meeting 1901 R1-1900503*, Taipei, Jan. 21-25, 2019.
Extended European Search Report for Application No. 20777506.5, dated Mar. 16, 2023, 12 pages.

* cited by examiner

100

In response to a non-empty intersection existing among time domain resources corresponding to beam failure recovery processes of N frequency domain bandwidths, perform any one of the methods below to perform the beam failure recovery processes of the N frequency domain bandwidth In method one for beam failure recovery, select the beam failure recovery process of one frequency domain bandwidth among the beam failure recovery processes of the N frequency domain bandwidths; perform the beam failure recovery process of the selected frequency domain bandwidth; and terminate or suspend beam failure recovery processes of the unselected frequency domain bandwidths In method two for beam failure recovery, combine the beam failure recovery processes of the N frequency domain bandwidths into one beam failure recovery process and perform the combined beam failure recovery process In method three for beam failure recovery, perform the beam failure recovery processes of the N frequency domain bandwidths concurrently

FIG. 1

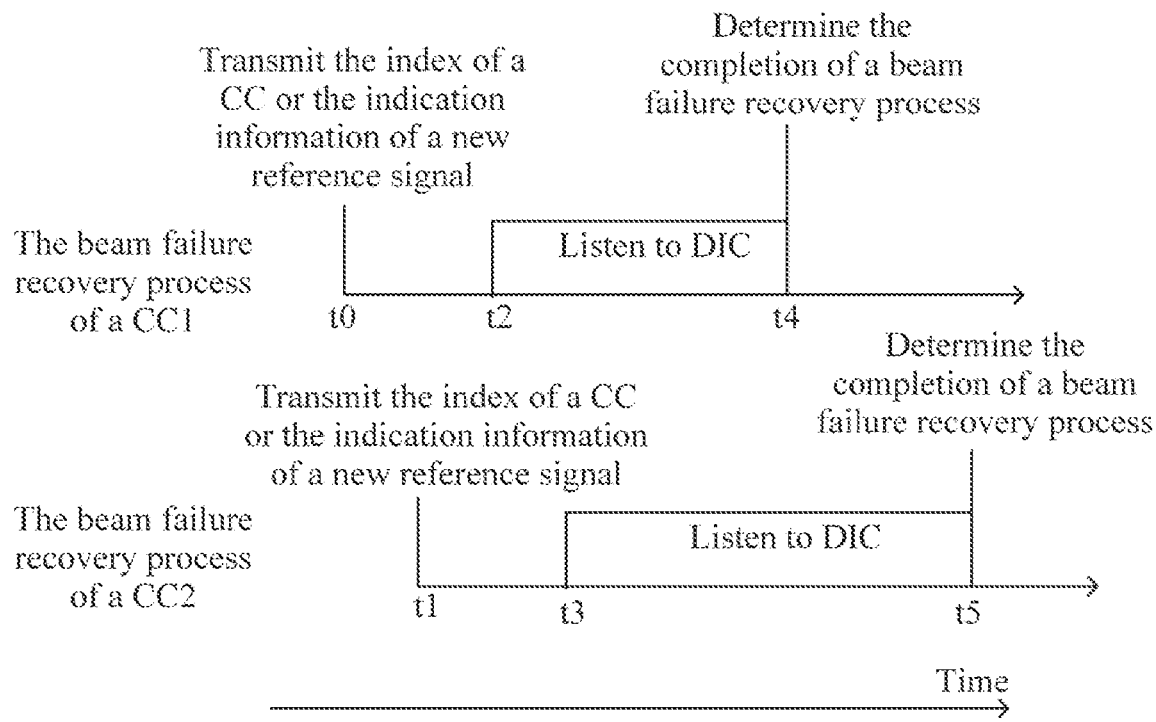

FIG. 2

BEAM FAILURE RECOVERY METHOD AND DEVICE, BEAM FAILURE RECOVERY PARAMETER DETERMINATION METHOD AND DEVICE, QUASI COLOCATION REFERENCE SIGNAL DETERMINATION METHOD AND DEVICE, AND STORAGE MEDIUM

CROSS-REFERENCE TO RELATED APPLICATION

This is a national stage application filed under 37 U.S.C. 371 based on International Patent Application No. PCT/CN2020/082032, filed on Mar. 30, 2020, which claims priority to Chinese Patent Application No. 201910245684.4 filed with the China National Intellectual Property Administration (CNIPA) on Mar. 28, 2019, the disclosure of which is incorporated herein by reference in its entirety.

TECHNICAL FIELD

Embodiments of the present disclosure relate to communication technology, for example, a method and apparatus for beam failure recovery, a method and apparatus for determining a beam failure recovery parameter, a method and apparatus for determining a quasi co-location reference signal, and a storage medium.

BACKGROUND

New radio (NR) access technology introduces the beam failure recovery process for a special cell (Spcell) to solve the problem of beam failure recovery for the Spcell. Accordingly, in the case where all the control channel resources of a base station fail to reach a terminal based on high-frequency communication, the terminal informs the base station of this information timely, informs the base station of a new beam selected by the terminal, and communicates with the base station automatically based on the selected new beam. The communication between the base station and the terminal can be recovered quickly without requiring the terminal to re-access the base station.

When the beam correlation between a secondary cell (Scell) and a primary cell (Pcell) is relatively poor, for example, in the case where the beam of the Pcell can communicate while the beam of the Scell cannot communicate (for example, when the Pcell is of low frequency while the Scell is of high frequency), the link of the Scell cannot be recovered timely if merely the beam failure recovery process for the Spcell is performed. Thus system performance is affected. Accordingly, the beam failure recovery process for the Scell needs to be performed. When both the beam failure recovery process for the Pcell and the beam failure recovery process for the Scell need to be performed, how to handle collision becomes a problem to be solved in the present disclosure.

How to quickly recover the link performance of a component carrier (CC) not configured with a beam failure detection reference signal or the link performance of a bandwidth part (BWP) not configured with a beam failure detection reference signal is another problem to be solved in the present disclosure.

SUMMARY

Embodiments of the present disclosure provides a method and apparatus for beam failure recovery, a method and apparatus for determining a beam failure recovery parameter, a method and apparatus for determining a quasi co-location reference signal, and a storage medium so as to perform beam failure recovery processes of N frequency domain bandwidths when a collision occurs among time domain resources corresponding to the beam failure recovery processes of the N frequency domain bandwidths.

Embodiments of the present disclosure provide a method for a beam failure recovery. The method includes the steps below.

In response to a non-empty intersection existing among time domain resources corresponding to beam failure recovery processes of N frequency domain bandwidths, any one of the methods below is performed.

The beam failure recovery process of one frequency domain bandwidth is selected among the beam failure recovery processes of the N frequency domain bandwidths: the beam failure recovery process of the selected frequency domain bandwidth is performed; and beam failure recovery processes of the unselected frequency domain bandwidths are terminated or suspended.

The beam failure recovery processes of the N frequency domain bandwidths are combined into one beam failure recovery process and the combined beam failure recovery process is performed.

The beam failure recovery processes of the N frequency domain bandwidths are performed simultaneously.

Here N is an integer greater than 1.

Embodiments of the present disclosure provide an apparatus for a beam failure recovery. The apparatus includes a first beam failure recovery module.

The first beam failure recovery module is configured to, in response to a non-empty intersection existing among time domain resources corresponding to beam failure recovery processes of N frequency domain bandwidths, perform any one of the methods below.

The beam failure recovery process of one frequency domain bandwidth is selected among the beam failure recovery processes of the N frequency domain bandwidths: the beam failure recovery process of the selected frequency domain bandwidth is performed; beam failure recovery processes of the unselected frequency domain bandwidths are terminated or suspended.

The beam failure recovery processes of the N frequency domain bandwidths are combined into one beam failure recovery process and the combined beam failure recovery process is performed.

The beam failure recovery processes of the N frequency domain bandwidths are performed simultaneously.

Here N is an integer greater than 1.

Embodiments of the present disclosure provide an apparatus for beam failure recovery. The apparatus includes a processor and a computer-readable storage medium. The computer-readable storage medium stores an instruction which, when executed by the processor, causes the processor to perform the preceding method for beam failure recovery.

Embodiments of the present disclosure provides a computer-readable storage medium storing a computer-executable instruction which, when executed by a processor, causes the processor to perform the preceding method for beam failure recovery.

Embodiments of the present disclosure include performing, in response to a non-empty intersection existing among time domain resources corresponding to beam failure recovery processes of N frequency domain bandwidths, any one of the following methods: selecting the beam failure recovery process of one frequency domain bandwidth among the beam failure recovery processes of the N frequency domain bandwidths, performing the beam failure recovery process of the selected frequency domain bandwidth, and terminating or suspending beam failure recovery processes of the unselected frequency domain bandwidths; combining the beam failure recovery processes of the N frequency domain bandwidths into one beam failure recovery process and performing the combined beam failure recovery process; or performing the beam failure recovery processes of the N frequency domain bandwidths simultaneously. Here N is a positive integer greater than 1. Embodiments of the present disclosure enable beam failure recovery processes of N frequency domain bandwidths to be performed when a collision occurs among time domain resources corresponding to the beam failure recovery processes of the N CCs, thus recovering the communication links of a plurality of frequency domain bandwidths rapidly, recovering the communication system rapidly, and reducing the complexity of a terminal.

Embodiments of the present disclosure provide a method for determining a beam failure recovery parameter so as to perform beam failure recovery processes corresponding to a plurality of frequency domain bandwidths effectively in the case where each frequency domain bandwidth has a corresponding beam failure recovery process.

Embodiments of the present disclosure provide a method for determining a beam failure recovery parameter. The method includes the steps below.

At least one of the following information is determined based on at least one of the signaling information or a predetermined rule: the correspondence relationship between one beam failure request resource and the first information of E frequency domain bandwidths, a condition to be satisfied by beam failure request resources of G frequency domain bandwidths, the correspondence relationship between one piece of first information and H types of resources, a transmission occasion of the first information corresponding to a first frequency domain bandwidth in a second frequency domain bandwidth, or beam failure recovery parameter information in response to one frequency domain bandwidth including beam failure recovery resources of F frequency domain bandwidths, where E, F, G, and H are each an integer greater than 1.

Embodiments of the present disclosure provide an apparatus for determining a beam failure recovery parameter. The apparatus includes an information determination module.

The information determination module is configured to determine at least one of the following information based on at least one of the signaling information or a predetermined rule: the correspondence relationship between one beam failure request resource and the first information of E frequency domain bandwidths, a condition to be satisfied by beam failure request resources of G frequency domain bandwidths, the correspondence relationship between one piece of first information and H types of resources, a transmission occasion of the first information corresponding to a first frequency domain bandwidth in a second frequency domain bandwidth, or beam failure recovery parameter information in response to one frequency domain bandwidth including beam failure recovery resources of F frequency domain bandwidths, where E, F, G, and H are each an integer greater than 1.

Embodiments of the present disclosure provide an apparatus for determining a beam failure recovery parameter. The apparatus includes a processor and a computer-readable storage medium. The computer-readable storage medium stores an instruction which, when executed by the processor, causes the processor to perform the preceding method for determining a beam failure recovery parameter.

Embodiments of the present disclosure provides a computer-readable storage medium storing a computer-executable instruction which, when executed by a processor, causes the processor to perform the preceding method for determining a beam failure recovery parameter.

Embodiments of the present disclosure include determining at least one of the following information based on at least one of the signaling information or a predetermined rule: the correspondence relationship between one beam failure request resource and the first information of E frequency domain bandwidths, a condition to be satisfied by beam failure request resources of G frequency domain bandwidths, the correspondence relationship between one piece of first information and H types of resources, a transmission occasion of the first information corresponding to a first frequency domain bandwidth in a second frequency domain bandwidth, or beam failure recovery parameter information in response to one frequency domain bandwidth including beam failure recovery resources of F frequency domain bandwidths, where E, F, G, and H are each an integer greater than 1; and performing a beam failure recovery process based on the determined information. Embodiments of the present disclosure implement beam failure recovery processes of a plurality of frequency domain bandwidths based on the preceding information so that two communication nodes that experience a beam failure event take unified operations and the power consumptions of the communication nodes are reduced.

Embodiments of the present disclosure provide a method for determining a quasi co-location signal so as to recover the link performance of a frequency domain bandwidth not configured with a beam failure detection reference signal.

Embodiments of the present disclosure provide a method for determining a quasi co-location signal so that the beam failure recovery process of only one frequency domain bandwidth among a plurality of frequency domain bandwidths is maintained. After a beam failure event occurs, beams of channels and/or signals in the frequency domain bandwidths are updated or activated automatically.

Embodiments of the present disclosure provide a method for determining a quasi co-location reference signal. The method includes the steps below.

A second-type frequency domain bandwidth corresponding to a first-type frequency domain bandwidth is determined.

The third information is transmitted in response to detecting a beam failure event based on a first-type reference signal of the first-type frequency domain bandwidth. Here the third information includes at least one of the reference signal index information of a second-type reference signal or the frequency domain bandwidth index information of the first-type frequency domain bandwidth.

A quasi co-location reference signal of a downlink signal in the second-type frequency domain bandwidth is acquired or updated based on at least one of the third information or a predetermined rule from a fourth predetermined moment; and/or a spatial transmission filter of an uplink signal in the second-type frequency domain bandwidth is acquired or updated based on at least one of the third information or the predetermined rule from a fifth predetermined moment.

Embodiments of the present disclosure provide an apparatus for determining a quasi co-location reference signal. The apparatus includes a first determination module, a transmission module, and a second determination module.

The first determination module is configured to determine a second-type frequency domain bandwidth corresponding to a first-type frequency domain bandwidth.

The transmission module is configured to transmit the third information in response to detecting a beam failure event based on a first-type reference signal of the first-type frequency domain bandwidth. Here the third information includes at least one of the reference signal index information of a second-type reference signal or the frequency domain bandwidth index information of the first-type frequency domain bandwidth.

The second determination module is configured to acquire or update a quasi co-location reference signal of a downlink signal in the second-type frequency domain bandwidth based on the third information and/or a predetermined rule from a fourth predetermined moment and/or acquire or update a spatial transmission filter of an uplink signal in the second-type frequency domain bandwidth based on the third information and/or the predetermined rule from a fifth predetermined moment.

Embodiments of the present disclosure provide an apparatus for determining a quasi co-location reference signal. The apparatus includes a processor and a computer-readable storage medium. The computer-readable storage medium stores an instruction which, when executed by the processor, causes the processor to perform the preceding method for determining a quasi co-location reference signal.

Embodiments of the present disclosure provides a computer-readable storage medium storing a computer-executable instruction which, when executed by a processor, causes the processor to perform the preceding method for determining a quasi co-location reference signal.

Embodiments of the present disclosure include determining a second-type frequency domain bandwidth corresponding to a first-type frequency domain bandwidth: transmitting the third information in response to detecting a beam failure event based on a first-type reference signal of the first-type frequency domain bandwidth, where the third information includes at least one of the reference signal index information of a second-type reference signal or the frequency domain bandwidth index information of the first-type frequency domain bandwidth; and acquiring or updating a quasi co-location reference signal of a downlink signal in the second-type frequency domain bandwidth based on the third information and/or a predetermined rule from a fourth predetermined moment and/or acquiring or updating a spatial transmission filter of an uplink signal in the second-type frequency domain bandwidth based on the third information and/or the predetermined rule from a fifth predetermined moment. Embodiment of the present disclosure implements the recovery of the link performance of a second-type frequency domain bandwidth through determining a second-type frequency domain bandwidth corresponding to a first-type frequency domain bandwidth. Accordingly, the beam failure recovery process of only one frequency domain bandwidth among a plurality of frequency domain bandwidths is maintained. After a beam failure event occurs, beams of channels and/or signals in the frequency domain bandwidths are updated or activated automatically. This reduces power consumption, reduces the overhead of a beam update signaling, and raises the probability of link performance recovery.

BRIEF DESCRIPTION OF DRAWINGS

FIG. 1 is a flowchart of a method for beam failure recovery according to one embodiment of the present disclosure.

FIG. 2 is a diagram illustrating that beam failure recovery processes of two CCs are performed simultaneously according to embodiments of the present disclosure.

DETAILED DESCRIPTION

Figure 3:
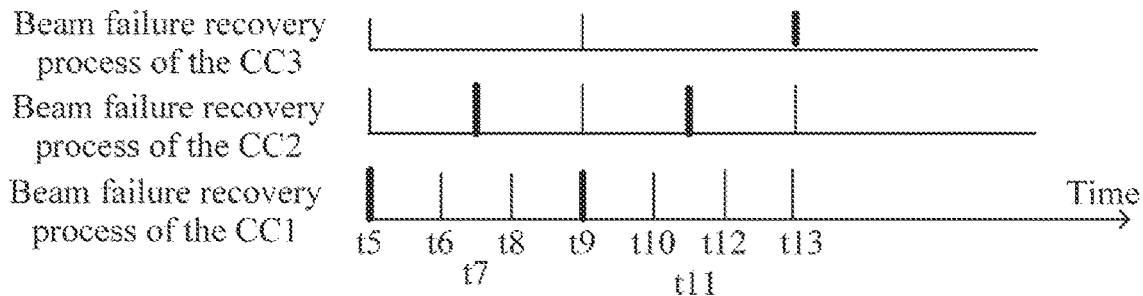
FIG. 3 is a diagram illustrating that one beam failure request resource is selected from a plurality of beam failure request resources whose time resources have a non-empty intersection when beam failure recovery processes of a plurality of CCs are performed simultaneously according to embodiments of the present disclosure.

Embodiments of the present disclosure will be described hereinafter in conjunction with drawings.

The steps illustrated in the flowcharts among the drawings may be performed by a computer system, such as a group of computer-executable instructions. Moreover, although logical sequences are illustrated in the flowcharts, the steps illustrated or described may be performed in sequences different from those described here in some cases.

In the related art, NR introduces the beam failure recovery process for a special cell (Spcell). Here in multi-connectivity, the Spcell is a Pcell of a master cell group (MCG) or a primary secondary cell (PScell) of a secondary cell group (SCG); in carrier aggregation and single connectivity, the Spcell is a Pcell. The beam failure recovery process for a Pcell includes the aspects below.

In step one, beam failure is detected. A terminal acquires a beam failure detection reference signal set through the signaling information transmitted by a base station and/or a quasi co-location reference signal of a control channel resource; then the terminal detects the link performance of a beam failure detection reference signal in the beam failure detection reference signal set (also referred to as a reference signal set q0) to acquire whether a beam failure event occurs. For example, when the times where the link performance of all the beam failure detection reference signals in the beam failure detection reference signal set is lower than a predetermined value reach the predetermined value (that is, the current value of a beam failure detection counter reaches the predetermined value), it is determined that a beam failure event occurs.

In step two, a new beam is selected. After detecting a beam failure event, the terminal selects one reference signal $q_{new}$ from a candidate reference signal set. Here the link performance of the selected reference signal $q_{new}$ is higher than the predetermined value.

In step three, beam failure request information is transmitted. After detecting the beam failure event, the terminal starts a random access process, starts a beam failure recovery timer, and transmits a preamble corresponding to the reference signal selected in step two based on the correspondence relationship between a preamble included in the signaling information transmitted by the base station and a reference signal in the candidate reference signal set.

In step four, beam failure response information is monitored. After the preamble is transmitted, a beam failure response information monitoring timer is started to monitor the response information of the base station. The response information includes the downlink control information (DCI) that is scrambled by a cell radio network temporary identifier (C-RNTI) or a modulation and coding scheme cell radio network temporary identifier (MCS-C-RNTI) and is transmitted in a beam failure recovery search space by the base station. When the response information is detected, it is considered that the beam failure request information is transmitted successfully; the beam failure recovery process is completed successfully; and the beam failure recovery timer and the beam failure response information monitoring timer are stopped. Otherwise, when no response information of the base station is detected in the predetermined time (that is, in the case where the beam failure response information monitoring timer times out), step two is returned to. When the beam failure recovery timer times out or the number of times for transmitting the beam failure request information exceeds a predetermined threshold, it is considered that the beam failure request information is not transmitted successfully; and the indication information that the beam failure request information is not transmitted successfully is transmitted to a higher layer.

In operation one, after the beam failure request information is transmitted and before the reconfiguration or activation information of a quasi co-location reference signal of a physical downlink control channel (PDCCH) is received, a demodulation reference signal of a control channel in the beam failure recovery search space and a demodulation reference signal of a data channel scheduled by the control channel in the beam failure recovery search space satisfy the quasi co-location (QCL) relationship with the reference signal $q_{new}$ corresponding to the recently transmitted beam failure request information.

In step five, from a predetermined moment after the response information of the base station is received successfully to a moment before the activation or reconfiguration information of the spatial relationship indication information of the physical uplink control channel (PUCCH) is received from the base station, a spatial filter of a beam failure detection reference signal that corresponds to the preamble and is transmitted by the terminal recently is used as a spatial filter on the Spcell. From the predetermined moment after the response information of the base station is received successfully, a demodulation reference signal of a control resource set (CORESET) 0 and the recently reported reference signal $q_{new}$ satisfy a quasi co-location relationship.

In the preceding beam failure recovery process, when the beam correlation between a secondary cell (Scell) and a primary cell (Pcell) is relatively poor, for example, in the case where the beam of the Pcell can communicate while the beam of the Scell cannot communicate (for example, when the Pcell is of low frequency while the Scell is of high frequency), the link of the Scell cannot be recovered timely if the beam failure recovery process is only performed for the Spcell. Thus system performance is affected. Accordingly, the beam failure recovery process needs to be performed for the Scell. When both the beam failure recovery process for the Pcell and the beam failure recovery process for the Scell (with the Pcell and the Scell belonging to different frequency domain bandwidths) need to be performed, how to handle collision becomes a problem to be solved in the present disclosure.

In the embodiments hereinafter, the beam failure recovery process of the Scell includes at least beam failure detection (that is, the preceding step one) or the transmission of beam failure request information (that is, the preceding step three), and may include one, more, or none of the following steps or operations: the selection of a new beam (that is, the preceding step two), the monitoring to beam failure response information (that is, the preceding step four), the update of a QCL parameter (that is, the preceding operation one), or the update of a transmission space filtering parameter (that is, the preceding step five). When the beam failure recovery process of the Scell does not include the selection of a new beam, the terminal transmits merely Scell index information to the base station in step three.

In the embodiments hereinafter, a quasi co-location parameter includes at least one of a Doppler shift, a Doppler spread, an average delay, a delay spread, or a spatial Rx parameter.

The case where two reference signals satisfy the quasi co-location relationship includes the case where the two reference signals satisfy the quasi co-location relationship regarding one type of a quasi co-location parameter. The case where the two reference signals satisfy the quasi co-location relationship regarding one type of a quasi co-location parameter includes the case where one type of a quasi co-location parameter of one reference signal may be acquired based on a quasi co-location parameter of another reference signal.

In the embodiments hereinafter, one frequency domain bandwidth includes at least one of one carrier component (CC), one BWP, or one physical resource block set.

In the embodiments hereinafter, a beam failure detection reference signal corresponding to one CC includes at least one of a beam failure detection reference signal that is configured through a signaling and is located in the CC (that is, a first-type reference signal, with the case not excluded in this embodiment that a beam failure detection reference signal of one CC in the signaling information may be located in other CCs), or a beam failure detection reference signal acquired based on a quasi co-location reference signal of a control channel resource in the CC (in this case, the beam failure detection reference signal may be located in other CCs or this CC).

A beam failure detection reference signal corresponding to one CC is a beam failure detection reference signal corresponding to an active BWP in the CC or a beam failure detection reference signal corresponding to one BWP in the CC.

In the embodiments hereinafter, the candidate reference signal set corresponding to one CC includes at least one of a reference signal corresponding to a beam failure detection reference signal of the CC.

When the occurrence of a beam failure event is detected based on a beam failure detection reference signal of the CC, one or more reference signals are selected from the candidate reference signal set of the CC; and the index information of the selected one or more reference signals is transmitted to the base station. In one embodiment, the link performance of the selected one or more reference signals is higher than a predetermined value. The candidate reference signal set corresponding to one CC may include reference signals located in different CCs.

The candidate reference signal set corresponding to one CC is the candidate reference signal set corresponding to an active BWP in the CC or the candidate reference signal set corresponding to one BWP in the CC.

When a beam failure event is detected based on a beam failure detection reference signal corresponding to one CC, the terminal transmits the first information (also referred to as beam failure request information or other names) corresponding to the CC. The first information includes at least one of the index of the CC, the index of an active BWP currently in the CC, the index of a BWP in the CC where beam failure occurs for the BWP, or the indication information of a new reference signal selected from the candidate reference signal set corresponding to the CC.

In the embodiments hereinafter, the first information of a plurality of frequency domain bandwidths includes the first information of each frequency domain bandwidth among the frequency domain bandwidths; for example, the first information of {CC1, CC2} includes {the first information of the CC1, the first information of the CC2}.

In the embodiments hereinafter, the beam failure search space corresponding to one CC represents that after the terminal transmits the first information corresponding to the CC, the DCI satisfying a predetermined characteristic is monitored in the beam failure search space corresponding to the CC; when the DCI satisfying the predetermined characteristic is heard, it is determined that the first information corresponding to the CC is transmitted successfully and the beam failure recovery process corresponding to the CC is completed. For example, the DCI satisfying the predetermined characteristic includes at least one of the DCI scrambled by a C-RNTI or the DCI scrambled by an MCS-C-RNTI. In the period from a moment after the first information corresponding to the CC is transmitted and to a moment when the DCI satisfying the predetermined characteristic is detected, the demodulation reference signal of the PDCCH of the DCI satisfying the predetermined characteristic and the demodulation reference signal of the physical downlink shared channel (PDSCH) scheduled by the DCI satisfying the predetermined characteristic satisfy the quasi-co-location relationship with the selected reference signal.

In the embodiments hereinafter, a reference signal includes at least one of a preamble, a demodulation reference signal, or a sounding reference signal.

In the embodiments hereinafter, a signal includes at least one of a reference signal, a synchronization signal, or a channel signal.

In the embodiments hereinafter, the case where two pieces of information are associated with each other includes at least one of the following cases: One piece of information may be acquired based on the other piece of information; the value range of one piece of information may be acquired based on the value range of the other piece of information, some value combinations of the two pieces of information are not desired, or the two pieces of information correspond to each other.

In the embodiments hereinafter, the beam failure recovery process of one frequency domain bandwidth include a series of beam failure recovery processes performed after a beam failure event is detected based on a beam failure detection reference signal in a beam failure detection reference signal set corresponding to one frequency domain bandwidth, that is, the beam failure recovery process corresponding to one frequency domain bandwidth as described hereinafter. The beam failure recovery process of one frequency domain bandwidth corresponds to one beam failure detection reference signal set.

One beam failure recovery process includes beam failure recovery processes of J frequency domain bandwidths; and beam failure request resources and/or beam failure search spaces of the beam failure recovery processes are located in the one frequency domain bandwidth. J is greater than or equal to 1.

For example, the beam failure recovery process of the CC1 includes a series of beam failure recovery processes performed after a beam failure event is detected based on a beam failure detection reference signal of the CC1. The beam failure request resource where the beam failure request information of the CC1 is located may be in the CC1 or in another CC such as the CC2. The beam failure search space of the CC1 may be in the CC1 or another CC such as the CC2.

The beam failure recovery processes of the CC2 include one or more beam failure recovery processes. For example, in the case where the beam failure request resource of the CC1 and the beam failure request resource of the CC2 are included in the CC2, and/or the beam failure search space of the CC1 and the beam failure search space of the CC2 are included in the CC2, beam failure recovery processes in the CC2 include the beam failure recovery process of the CC1 and the beam failure recovery process of the CC2.

In summary, in the description hereinafter, the beam failure recovery process of one frequency domain bandwidth is one beam failure recovery process; and the beam failure recovery parameter of one frequency domain bandwidth is one set of beam failure recovery parameters. The first information of one frequency domain is one pieces of first information corresponding to one frequency domain. The first information of a frequency domain bandwidth 1 may be transmitted in the frequency domain bandwidth 1 or another frequency domain bandwidth. In the description of the present disclosure, the beam failure recovery process/beam failure recovery parameter/first information of one frequency domain bandwidth is sometimes described as the beam failure recovery process/beam failure recovery parameter/first information corresponding to one frequency domain bandwidth.

One frequency domain bandwidth includes one or more beam failure recovery processes, and one or more beam failure recovery resources of the one or more beam failure recovery processes are located in the frequency domain bandwidth. One frequency domain bandwidth includes one or more sets of beam failure recovery parameters. One frequency domain bandwidth includes one or more pieces of first information, and the one or more pieces of first information is transmitted in the frequency domain bandwidth. A beam failure recovery resource includes at least one of a beam failure request resource where beam failure request information is located or a beam failure search space resource.

In the embodiments hereinafter, a transmission occasion includes at least one of the following resources for transmitting the first information: a time domain resource, a frequency domain resource, or a code domain resource, and represents a transmission resource for transmitting the first information.

One transmission occasion includes one or more code domain resources. When one transmission occasion includes more than one code domain resource, one code domain resource in the transmission occasion is selected for transmission based on the correspondence relationship between the first information and the code domain resources in the transmission occasion. For example, one transmission occasion corresponds to one synchronous signal block (SSB). Based on the SSB index, the transmission occasion corresponding to the SSB index may be discovered. One code domain resource in the transmission occasion is referred to as one beam failure request resource.

When the terminal (or a detection end of a beam failure detection reference signal) discovers a beam failure event, the first information is transmitted on one or more beam failure request resources. In summary, one beam failure request resource corresponds to (one time domain resource, one frequency domain resource, one code domain resource); one transmission occasion includes one or more beam failure request resources, and a plurality of beam failure request resources included in one transmission occasion have the same time domain, the same frequency domain, and different code domains. For example, one transmission occasion is one PRACH occasion corresponding to one SSB, and one beam failure request resource corresponds to one preamble in one PRACH occasion.

In the embodiments hereinafter, a beam failure request resource includes at least one of a PRACH resource, a PUCCH resource, a physical uplink shared channel (PUSCH) resource, a medium access control-control element (MAC-CE) signaling, or a scheduling request (SR) resource.

In the embodiments hereinafter, information transmission includes the transmission in an explicit manner or the transmission in an implicit manner. For example, the transmission in an explicit manner includes the transmission of an information bit representing the information: and the transmission in an implicit manner includes the transmission of one reference signal. Here the transmitting end and the receiving end are predetermined, and the reference signal corresponds to the information.

Referring to FIG. 1, one embodiment of the present disclosure provides a method for beam failure recovery. The method includes the steps below.

In step 100, in response to a non-empty intersection existing among time domain resources corresponding to beam failure recovery processes of N frequency domain bandwidths, any one of the methods below is performed to perform the beam failure recovery processes of the N frequency domain bandwidth. Here the case where the non-empty intersection exists among the time domain resources corresponding to the beam failure recovery processes of the N frequency domain bandwidths refers to the case where a non-empty intersection exists among time domain resources corresponding to beam failure recovery processes of N1 frequency domain bandwidths among the N frequency domain bandwidths. Here N1 is an integer greater than or equal to 1 or smaller than or equal to N.

In method one for beam failure recovery, the beam failure recovery process of one frequency domain bandwidth is selected among the beam failure recovery processes of the N frequency domain bandwidths; the beam failure recovery process of the selected frequency domain bandwidth is performed; and beam failure recovery processes of the unselected frequency domain bandwidths are terminated or suspended.

In the preceding method one for beam failure recovery, any method may be used for performing the step in which the beam failure recovery process of one frequency domain bandwidth is selected among the beam failure recovery processes of the N frequency domain bandwidths. The implementation method is not used for limiting the protection scope of embodiments of the present disclosure. For example, the step in which the beam failure recovery process of one frequency domain bandwidth is selected among the beam failure recovery processes of the N frequency domain bandwidths includes at least one of the steps below.

The beam failure recovery process of one frequency domain bandwidth among the beam failure recovery processes of the N frequency domain bandwidths is selected based on the second information; in response to a beam failure event occurring in a primary cell (Pcell) and a beam failure event occurring in a secondary cell (Scell), the beam failure recovery process of the Pcell is selected and the beam failure recovery process of the Scell is suspended or terminated; or in response to a beam failure event occurring in one Scell and in response to the beam failure recovery process of another Scell being performed, a communication node determines independently that the beam failure event of either of the two Scells is performed. Here one cell corresponds to one frequency domain bandwidth.

In the preceding method one for beam failure recovery, the step in which beam failure recovery processes of the unselected frequency domain bandwidths are terminated or suspended includes at least one of the manners below.

Beam failure timers corresponding to the unselected frequency domain bandwidths are suspended or terminated: or first information transmission counters corresponding to the unselected frequency domain bandwidths are set to a predetermined value. Here a beam failure timer includes at least one of a beam failure recovery timer or a beam failure response information monitoring timer.

Here the second information includes at least one of the priority of a frequency domain bandwidth, a parameter of a frequency domain bandwidth, the number of times for transmitting the first information corresponding to a frequency domain bandwidth, a parameter of the beam failure request resource corresponding to a frequency domain bandwidth, the received signaling information, the information about whether a frequency domain bandwidth includes a special cell (Spcell), timing advance information, or the information about whether the beam failure recovery process corresponding to a frequency domain bandwidth is in a response information monitoring stage currently.

Here a parameter of a frequency domain bandwidth includes at least one of the frequency domain bandwidth index, the frequency domain bandwidth magnitude, the frequency domain bandwidth of an active bandwidth part (BWP) in the frequency domain bandwidth, the subcarrier spacing of an active BWP in the frequency domain bandwidth, the frequency domain bandwidth of one BWP in the frequency domain bandwidth where a beam failure event occurs for the BWP, or the subcarrier spacing of one BWP in the frequency domain bandwidth where a beam failure event occurs for the BWP.

Here a parameter of a beam failure request resource includes at least one of a frequency domain parameter, a time domain parameter, a power parameter, or a period length.

In method two for beam failure recovery, the beam failure recovery processes of the N frequency domain bandwidths are combined into one beam failure recovery process and the combined beam failure recovery process is performed.

In the preceding method two for beam failure recovery, the step in which the beam failure recovery processes of the N frequency domain bandwidths are combined into one beam failure recovery process and the combined beam failure recovery process is performed includes at least one of the manners below.

The N frequency domain bandwidths correspond to one beam failure timer; the N frequency domain bandwidths correspond to one first information transmission counter: only one beam failure timer is caused to operate at one time point: a beam failure recovery timer is started or restarted in response to a beam failure event occurring in one frequency domain bandwidth; the first information transmission counter is set to 0 in response to a beam failure event occurring in one frequency domain bandwidth; a beam failure response information monitoring timer is started or restarted after the first information corresponding to one frequency domain bandwidth set is transmitted; in response to requiring the transmission of the first information corresponding to one frequency domain bandwidth, a frequency domain bandwidth set is determined and a beam failure event occurs and has not been recovered successfully for each frequency domain bandwidth in the frequency domain bandwidth set, one or more beam failure request resources are selected based on the determined frequency domain bandwidth set, and the first information corresponding to the frequency domain bandwidth set is transmitted on the one or more beam failure request resources, in response to requiring the transmission of the first information corresponding to one frequency domain bandwidth, a frequency domain bandwidth is determined and a beam failure event occurs and has not been recovered successfully for each frequency domain bandwidth in the frequency domain bandwidth set, and the first information corresponding to the frequency domain bandwidth set is transmitted; in response to requiring the transmission of the first information corresponding to one frequency domain bandwidth, a frequency domain bandwidth set is determined. M frequency domain bandwidths are selected from the determined frequency domain bandwidth set and a beam failure event occurs and has not been recovered successfully for each frequency domain bandwidth in the frequency domain bandwidth set, one or more beam failure request resource are selected based on the selected M frequency domain bandwidths, and the first information corresponding to the M frequency domain bandwidths is transmitted on the one or more beam failure request resources, in response to requiring the transmission of the first information corresponding to one frequency domain bandwidth, a frequency domain bandwidth set is determined and a beam failure event occurs and has not been recovered successfully for each frequency domain bandwidth in the frequency domain bandwidth set, M frequency domain bandwidths are selected from the determined frequency domain bandwidth set, and the first information corresponding to the M frequency domain bandwidths is transmitted: C pieces of response information are monitored, here one piece of response information is the response information of the first information corresponding to one or more frequency domain bandwidth sets and C is a non-negative integer smaller than or equal to N; or in response to receiving the response information corresponding to one frequency domain bandwidth set, it is determined that the beam failure recovery process corresponding to the frequency domain bandwidth set is completed successfully. Here the first information includes at least one of the index of a CC, the index of an active BWP currently in the CC, the index of a bandwidth part (BWP) in the CC where beam failure occurs for the bandwidth part (BWP), or the indication information of a new reference signal selected from the candidate reference signal set corresponding to the CC. Thus, each of the N frequency domain bandwidths corresponds to one beam failure timer.

A beam failure timer includes at least one of a beam failure recovery timer or a beam failure response information monitoring timer. A frequency domain bandwidth set includes one or more frequency domain bandwidths.

In embodiments of the present disclosure, the step in which the first information corresponding to the frequency domain bandwidth set is transmitted on one beam failure request resource includes the manner of transmitting one reference signal in the beam failure request resource, where the reference signal corresponds to the first information corresponding to the frequency domain bandwidth set; or transmitting an information bit representing the first information corresponding to the frequency domain bandwidth set on the beam failure request resource. Here the correspondence relationship between the reference signal of one beam failure request resource and the first information corresponding to the frequency domain bandwidth set may be included in the received signal information.

The step in which the first information corresponding to the frequency domain bandwidth set is transmitted on a plurality of beam failure request resources includes one of the following manners: The first information corresponding to the frequency domain bandwidth set is transmitted on each beam failure request resource of the beam failure request resources: the first information corresponding to one frequency domain bandwidth in the frequency domain bandwidth set is transmitted on each beam failure request resource of the beam failure request resources; or the first information corresponding to part of the frequency domain bandwidths in the frequency domain bandwidth set is transmitted on each beam failure request resource of the beam failure request resources.

The step in which one or more beam failure request resources are selected based on the determined frequency domain bandwidth set includes the following manner: One or more beam failure request resources are selected from P beam failure request resources based on the determined frequency domain bandwidth set.

The step in which M frequency domain bandwidths are selected from the determined frequency domain bandwidth set includes the step of selecting the M frequency domain bandwidths from the determined frequency bandwidth set based on the second information.

The step in which C pieces of response information are monitored includes one of the following manners: The C pieces of response information are monitored in one beam failure search space; one piece of response information corresponding to a beam failure search space is monitored in the beam failure search space of C beam failure search spaces, where the one piece of response information is among the C pieces of response information; or the C pieces of response information are monitored in more than one frequency domain bandwidth.

Here the P beam failure request resources include one of P beam failure request resources of beam failure request resources corresponding to the N frequency domain bandwidths; a union of the beam failure request resources corresponding to the N frequency domain bandwidths; beam failure request resources corresponding to the first information corresponding to the M frequency domain bandwidths in the union of the beam failure request resources corresponding to the N frequency domain bandwidths: a union of the beam failure request resources corresponding to the M frequency domain bandwidths; or a beam failure request resource in one frequency domain bandwidth.

In method three for beam failure recovery, the beam failure recovery processes of the N frequency domain bandwidths are performed simultaneously.

In the preceding method three for beam failure recovery, the maximum number of the beam failure recovery processes performed simultaneously is associated with the number of frequency domain bandwidths each of which is configured with a beam failure recovery parameter, and/or the maximum number of the beam failure recovery processes performed simultaneously is smaller than or equal to a predetermined value. For example, the maximum number of the beam failure recovery processes that correspond to time domain resources with a non-empty intersection and are among the beam failure recovery processes performed simultaneously is smaller than or equal to the number of frequency domain bandwidths each of which is configured with a beam failure recovery parameter.

In the preceding method three for beam failure recovery, no constraint may be implemented for the step in which the beam failure recovery processes of the N frequency domain bandwidths are performed simultaneously. For example, the beam failure recovery processes of the N frequency domain bandwidths performed simultaneously are independent of each other and do not affect each other.

Alternatively, some constraints may be implemented for the step in which the beam failure recovery processes of the N frequency domain bandwidths are performed simultaneously. For example, in the beam failure recovery processes of the N frequency domain bandwidths performed simultaneously, the first information corresponding to one frequency domain bandwidth can be transmitted only on one uplink beam failure request resource at one time.

For example, the step in which the beam failure recovery processes of the N frequency domain bandwidths are performed simultaneously includes at least one of the manners below.

Each frequency domain bandwidth of the N frequency domain bandwidths corresponds to one beam failure timer; Y1 frequency domain bandwidths among the N frequency domain bandwidths are caused to exist and correspond to beam failure timers whose operation periods have a non-empty intersection, where Y1 is an integer greater than or equal to 1 and smaller than or equal to N: one or more beam failure timers in N beam failure timers corresponding to the N frequency domain bandwidths are caused to operate at one time point; each frequency domain bandwidth of the N frequency domain bandwidths corresponds to one first information transmission counter; in response to a beam failure event occurring in a first frequency domain bandwidth and in response to at least the beam failure recovery process of a second frequency domain bandwidth being performed, the beam failure recovery timer corresponding to the first frequency domain bandwidth is started, where the first frequency domain bandwidth and the second frequency domain bandwidth are two different frequency domain bandwidths of the N frequency domain bandwidths; in response to requiring the transmission of the first information corresponding to a third frequency domain bandwidth and in response to at least the beam failure recovery process of a fourth frequency domain bandwidth being performed, the first information corresponding to the third frequency domain bandwidth is transmitted on the beam failure request resource corresponding to the third frequency domain bandwidth, where the third frequency domain bandwidth and the fourth frequency domain bandwidth are two different frequency domain bandwidths of the N frequency domain bandwidths; N pieces of response information is monitored, where one piece of response information among the N pieces of response information is the beam failure response information corresponding to one ore more frequency domain bandwidths of the N frequency domain bandwidths; in the same period, in response to a non-empty intersection existing among time domain resources occupied by beam failure request resources corresponding to N pieces of first information of the N frequency domain bandwidths, M pieces of first information among the N pieces of first information are transmitted in one channel, or M pieces of first information among the N pieces of first information are transmitted in M channels; in the same period, in response to a non-empty intersection existing among the time domain resources occupied by the N beam failure request resources corresponding to the N pieces of first information, the first information is transmitted on each corresponding beam failure request resource; the N pieces of first information is transmitted in response to an empty intersection existing among the N beam failure request resources corresponding to the N pieces of first information in the same period; the signaling information including correspondence relationships among frequency domain bandwidths, beam failure request resources, and first information is received, where the time domain resources occupied by the beam failure request resources of the N frequency domain bandwidths in the signaling information have an empty intersection; or in response to receiving the response information corresponding to a fifth frequency domain bandwidth before the timeout of the beam failure response information monitoring timer corresponding to the fifth frequency domain bandwidth, it is determined that the beam failure recovery process corresponding to the fifth frequency domain bandwidth is completed successfully, and the beam failure timer corresponding to the fifth frequency domain bandwidth is stopped, where the fifth frequency domain bandwidth is any one frequency domain bandwidth of the N frequency domain bandwidths.

Here the first information includes at least one of the index of a carrier component (CC), the index of an active BWP currently in the CC, the index of a BWP in the CC where beam failure occurs for the BWP, or the indication information of a new reference signal selected from the candidate reference signal set corresponding to the CC.

A beam failure timer includes at least one of a beam failure recovery timer or a beam failure response information monitoring timer. Here M is a positive integer greater than or equal to 1 and smaller than or equal to N.

In embodiments of the present disclosure, the step in which the beam failure recovery process of one frequency domain bandwidth is being performed includes the manner in which the beam failure timer of one frequency domain bandwidth is being performed.

In embodiments of the present disclosure, in the condition of transmitting M pieces of first information among the N pieces of first information in one channel or transmitting M pieces of first information among the N pieces of first information in M channels, the one channel or the M channels satisfy one of the characteristics below.

The one channel corresponds to one beam failure request resource in the N beam failure request resources in the same period; the one channel corresponds to one beam failure request resource not included in the N beam failure request resources in the same period; a reference signal of the one channel corresponds to the M pieces of first information, or the one channel includes information bits representing the M pieces of first information: time domain resources occupied by the M channels are a subset of a union of the time domain resources occupied by the N beam failure request resources in the same period; or a time domain resource occupied by each channel of the M channels is a subset of the union of the time domain resources occupied by the N beam failure request resources in the same period, and time domain resources occupied by different channels have an empty intersection.

In embodiments of the present disclosure, the M pieces of first information are selected based on the second information.

In embodiments of the present disclosure, the step in which N pieces of response information is monitored includes one of the following manners: One piece of response information among the N pieces of response information is monitored in each beam failure search space of N beam failure search spaces; the N pieces of response information is monitored in one beam failure search space; or the N pieces of response information is monitored in one or more frequency domain bandwidths.

In embodiments of the present disclosure, a frequency domain bandwidth corresponding to the transmitted first information satisfies at least one of the characteristics below.

In the period from a first predetermined moment after the first information corresponding to the frequency domain bandwidth is transmitted to the occurrence of a predetermined event, a predetermined demodulation reference signal and a reference signal included in the first information corresponding to the frequency domain bandwidth satisfy the quasi co-location (QCL) relationship; from a second predetermined moment after the response information of the frequency domain bandwidth is received successfully to a moment before the activation or reconfiguration information of the spatial relationship indication information of an uplink control channel in the frequency domain bandwidth is received, a spatial transmission filter of an uplink channel in the frequency domain bandwidth and/or a spatial transmission filter of an uplink signal in the frequency domain bandwidth is acquired based on a spatial transmission filter transmitting the first information corresponding to the frequency domain bandwidth; or from a third predetermined moment after the response information of the frequency domain bandwidth is received successfully, a demodulation reference signal in a control channel resource set CORESET 0 and a reference signal included in the transmitted first information corresponding to the frequency domain bandwidth including the CORESET 0 satisfy the QCL relationship.

Here the predetermined demodulation reference signal includes at least one of: a demodulation reference signal of a control channel in the beam failure recovery search space of the frequency domain bandwidth, a demodulation reference signal of a data channel scheduled by the control channel in the beam failure recovery search space of the frequency domain bandwidth, a demodulation reference signal of a data channel that is in the frequency domain bandwidth and is scheduled by the control channel in the beam failure recovery search space of the frequency domain bandwidth, a demodulation reference signal of a control channel in a beam failure recovery search space in the frequency domain bandwidth, a demodulation reference signal of a data channel scheduled by a control channel in a beam failure recovery search space in the frequency domain bandwidth, or a demodulation reference signal of a data channel that is in the frequency domain bandwidth and is scheduled by a control channel in a beam failure recovery search space in the frequency domain bandwidth.

Here the predetermined event includes one of the events below.

After at least one piece of response information is detected in the beam failure recovery search space of the frequency domain bandwidth, the reconfiguration or activation information of a quasi co-location reference signal of the downlink control channel of the frequency domain bandwidth is received; after at least one piece of response information is detected in the beam failure recovery search space of the frequency domain bandwidth, the reconfiguration or activation information of a quasi co-location reference signal of a downlink control channel in a frequency domain bandwidth corresponding to a beam failure detection reference signal set, the reconfiguration or activation information of a quasi co-location reference signal of the downlink control channel of the frequency domain bandwidth is received; the reconfiguration or activation information of a quasi co-location reference signal of a downlink control channel is received; or the detection of a control channel in the beam failure search space of the frequency domain bandwidth is stopped.

Here at least one of the first predetermined moment, the second predetermined moment, or the third predetermined moment is acquired based on at least one of a subcarrier spacing of a BWP where the beam failure request resource for transmitting the first information corresponding to the frequency domain bandwidth is located, a subcarrier spacing of an active BWP in the frequency domain bandwidth, or a ratio of the subcarrier spacing of the active BWP in the frequency domain bandwidth to the subcarrier spacing of the BWP where the beam failure request resource for transmitting the first information corresponding to the frequency domain bandwidth is located.

In embodiments of the present disclosure, beam failure request resources corresponding to the N frequency domain bandwidths belong to the same frequency domain bandwidth or different frequency domain bandwidths respectively; and/or, beam failure search spaces corresponding to the N frequency domain bandwidths belong to the same frequency domain bandwidth or different frequency domain bandwidths respectively.

In embodiments of the present disclosure, one frequency domain bandwidth includes at least one of one carrier component (CC), one BWP, or one physical resource block set; and/or, the first information corresponding to one CC includes the first information corresponding to one BWP in the CC. Here one BWP includes at least one of an active BWP currently in one CC, a BWP corresponding to the reference signal corresponding to the reference signal indication information included in the first information corresponding to the CC, or a BWP corresponding to the BWP indication information included in the first information corresponding to the CC.

In embodiments of the present disclosure, the case where the non-empty intersection exists among the time domain resources corresponding to the beam failure recovery processes of the N frequency domain bandwidths includes at least one of the cases below.

In response to requiring the transmission of the first information corresponding to one frequency domain bandwidth, at least the beam failure recovery process of another frequency domain bandwidth is being performed; in response to requiring the transmission of the first information corresponding to one frequency domain bandwidth, at least the beam failure response information of another frequency domain bandwidth is being monitored: or in the intersection among the time domain resources corresponding to the beam failure recovery processes of the N frequency domain bandwidths, a beam failure event occurs and has not been recovered successfully for each frequency domain bandwidth in the N frequency domain bandwidths.

Here the time domain resource corresponding to a beam failure recovery process includes at least one of a period from detecting a beam failure event to hearing beam failure response information, a period from detecting a beam failure event to stopping monitoring a period of a control channel in a beam failure search space, a period from transmitting the first information corresponding to a frequency domain bandwidth to hearing beam failure response information, a period from transmitting the first information to stopping monitoring a control channel in a beam failure search space, an operation period of a beam failure recovery timer, or an operation period of a beam failure response information monitoring timer.

In another embodiment of the present disclosure, the method further includes the step below.

It is determined whether a beam failure event occurs for each frequency domain bandwidth by detecting a beam failure detection reference signal in a beam failure detection reference signal set corresponding to each frequency domain bandwidth, where different frequency domain bandwidths correspond to different beam failure detection reference signal sets.

Embodiments of the present disclosure enable beam failure recovery processes of N CCs to be performed when a collision occurs among time domain resources corresponding to the beam failure recovery processes of the N CCs, thus recovering the communication links of a plurality of frequency domain bandwidths rapidly.

Another embodiment of the present disclosure provides a method for determining a beam failure recovery parameter. The method includes the steps below.

At least one of the following information is determined based on at least one of the signaling information or a predetermined rule: the correspondence relationship between one beam failure request resource and the first information of E frequency domain bandwidths, a condition to be satisfied by beam failure request resources of G frequency domain bandwidths, the correspondence relationship between one piece of first information and H types of resources, a transmission occasion of the first information corresponding to a first frequency domain bandwidth in a second frequency domain bandwidth, or beam failure recovery parameter information in response to one frequency domain bandwidth including beam failure recovery resources of F frequency domain bandwidths, where E, F, G, and H are each an integer greater than 1.

In another embodiment of the present disclosure, the method further includes the step below.

A beam failure recovery process is performed based on the determined information. The manner of performing a beam failure recovery process based on the determined information may refer to implementation processes of other embodiments. For example, at least one of the following processes of a Pcell and/or a Scell is performed based on the determined information: Beam failure is detected; a new beam is selected; beam failure request information is transmitted; beam failure response information is monitored, a QCL parameter is determined, a spatial transmission filter is determined, and so on. This is not repeated here.

In embodiments of the present disclosure, for example, the signal information includes the correspondence relationship between one beam failure request resource and the first information of E frequency domain bandwidths. For example, in the preceding step in which the beam failure recovery processes of the N frequency domain bandwidths are performed simultaneously, M pieces of first information among the N pieces of first information are transmitted in one channel; alternatively, in the case where M pieces of first information among the N pieces of first information are transmitted in M channels; the first information of the E frequency domain bandwidths is the preceding M pieces of first information.

In another example, in the preceding step in which the beam failure recovery processes of the N frequency domain bandwidths are combined into one beam failure recovery process and the combined beam failure recovery process is performed, the first information of the E frequency domain bandwidths is the first information corresponding to the preceding M channels or the first information corresponding to a frequency domain bandwidth set.

In another example, in the preceding step in which the beam failure recovery process of one frequency domain bandwidth is selected among the beam failure recovery processes of the N frequency domain bandwidths, in which the beam failure recovery process of the selected frequency domain bandwidth is performed, and in which beam failure recovery processes of the unselected frequency domain bandwidths are terminated or suspended, the first information of the E frequency domain bandwidths is the first information of one of the frequency domain bandwidths.

In embodiments of the present disclosure, the step of determining a condition to be satisfied by beam failure request resources of G frequency domain bandwidths includes at least one of the manners below.

An empty intersection is caused to exist among time domain resources occupied by the beam failure request resources of the G frequency domain bandwidths in the same period; alternatively, a random access transmission occasion does not include beam failure request resources of more than one frequency domain bandwidth.

Here one transmission occasion may be one PRACH occasion or a resource of a periodic uplink channel resource in one period.

For example, the G frequency domain bandwidths are the N frequency domain bandwidths in the preceding embodiment.

In embodiments of the present disclosure, the step of determining the correspondence relationship between one piece of first information and H types of resources includes at least one of the manners below.

The signaling information includes the correspondence relationship between the one piece of first information and the H types of resources.

A first-type resource and a second-type resource that are included in the H types of resources satisfy at least one of the following characteristics: The first-type resource is associated with one piece of spatial relationship indication information, or the second-type resource is associated with no spatial relationship indication information; a first-type resource includes at least one of a physical uplink control channel (PUCCH) resource, a PRACH resource, or a scheduling request (SR) resource; and a second-type resource includes a PRACH resource.

The H types of resources are located in different frequency domain bandwidths.

The H types of resources include resources located in different bandwidth parts (BWP) of one component carrier (CC).

The H types of resources include different resources of a CC where the H types of resources are located.

Here one piece of first information is the first information corresponding to one frequency domain bandwidth or the first information corresponding to one frequency domain bandwidth set. For example, the first information corresponding to a frequency domain bandwidth set {CC1, CC2} includes {the first information corresponding to the CC1, the first information corresponding to the CC2}.

In embodiments of the present disclosure, the method further includes at least one of the steps below.

The one piece of first information is transmitted in one or more types of resources among the H types of resources, where a BWP where the one or more types of resources are located is in the active state currently; the one piece of first information is transmitted in one or more types of resources among the H types of resources, where no beam failure event occurs for a frequency domain bandwidth where the one or more types of resources are located; the one piece of first information is transmitted in one or more types of the resources among the H types of resources in response to a beam failure event occurring in each of the frequency domain bandwidths where the H-type resources are located: the first information is transmitted in the first-type resource in response to no beam failure event occurring in a frequency domain bandwidth where the first-type resource associated with the one piece of first information is located; or the first information is transmitted in the second-type resource in response to a beam failure event occurring in a frequency domain bandwidth where the first-type resource associated with the one piece of first information is located.

In embodiments of the present disclosure, the determination of a transmission occasion of the first information corresponding to a first frequency domain bandwidth in a second frequency domain bandwidth includes one of the manners below.

The signaling information includes the correspondence relationship between the first information corresponding to the first frequency domain bandwidth and the index of the transmission occasion in the second frequency domain bandwidth; the signaling information includes the correspondence relationship between the first information corresponding to the first frequency domain bandwidth and the index of a synchronous signal block (SSB) corresponding to the second frequency domain bandwidth: the transmission occasion is determined based on the index of an SSB corresponding to a reference signal in the beam failure detection reference signal set corresponding to the second frequency domain bandwidth, where the link performance of the reference signal is higher than a predetermined threshold; the transmission occasion is determined based on the index of an SSB corresponding to a reference signal in the candidate reference signal set corresponding to the second frequency domain bandwidth, where the link performance of the reference signal is higher than a predetermined threshold; the transmission occasion is determined based on the index of an SSB corresponding to a reference signal in the candidate reference signal set corresponding to the first frequency domain bandwidth, where the link performance of the reference signal is higher than a predetermined threshold; or the transmission occasion is determined based on an SSB corresponding to a reference signal included in the first information of the first frequency domain.

Here an SSB corresponding to one reference signal includes an SSB satisfying the quasi co-location relationship with the reference signal.

In embodiments of the present disclosure, the manner in which the signaling information includes the correspondence relationship between the first information corresponding to the first frequency domain bandwidth and the index of the transmission occasion in the second frequency domain bandwidth includes the manners in which the signaling information includes the first information, one or more pieces of transmission occasion index information, and the reference signal sequence information in beam failure request resources; alternatively, the manner in which the signaling information includes the correspondence relationship between the first information corresponding to the first frequency domain bandwidth and the index of an SSB includes the manner in which the signaling information includes the first information, indices of one or more SSBs, and the reference signal sequence information in beam failure request resources.

In embodiments of the present disclosure, the step of determining the beam failure recovery parameter information in response to one frequency domain bandwidth including beam failure recovery resources of F frequency domain bandwidths includes at least one of the manners below.

The F frequency domain bandwidths correspond to F sets of first-type beam failure recovery parameter information and F sets of second-type beam failure recovery parameter information; the F frequency domain bandwidths correspond to one set of first-type beam failure recovery parameter information and F sets of second-type beam failure recovery parameter information; the F frequency domain bandwidths correspond to one set of first-type beam failure recovery parameter information and one set of second-type beam failure recovery parameter information; or the correspondence relationship between the F frequency domain bandwidths and F sets of first-type beam failure recovery parameters and/or F sets of second-type beam failure recovery parameters is determined based the signaling information and/or the predetermined rule.

Here one beam failure recovery resource includes at least one of a beam failure request resource or a beam failure search space resource.

In embodiments of the present disclosure, the first-type beam failure recovery parameter information includes at least one of the following configuration information: the format information of a preamble included in a PRACH (this parameter may be prach-Configuration Index), the frequency domain resource information of the PRACH (this parameter may be msg1-FDM and/or msg1-FrequencyStart), the target received power information of the PRACH, the maximum transmitted power information of the preamble, power ramping step information, the maximum duration information of a beam failure response information monitoring timer, the cyclic shift information of the preamble, the maximum duration corresponding to a beam failure detection timer, or the maximum number of times corresponding to a beam failure detection counter.

In embodiments of the present disclosure, the second-type beam failure recovery parameter information includes at least one of the following configuration information: the starting logical root index information of a preamble, the performance threshold information of a beam failure detection reference signal, the information of the correspondence relationship between a candidate reference signal and the preamble, the information of the mapping relationship between an SSB and a PRACH transmission occasion (for example, this parameter is the ssb-perRACH-Occasion information), the PRACH transmission occasion index information in a PRACH transmission occasion set corresponding to one SSB (for example, this parameter is ra-ssb-OccasionMask Index), a beam failure search space, a beam failure recovery timer, or a candidate reference signal set.

In embodiments of the present disclosure, the first information includes at least one of the index of a CC, the index of an active BWP currently in the CC, the index of a BWP in the CC where beam failure occurs for the BWP, the indication information of a new reference signal selected from the candidate reference signal set corresponding to the CC, beam failure request information, or the information transmitted in response to detecting a beam failure event through detecting one reference signal set.

In embodiments of the present disclosure, a frequency domain bandwidth includes at least one of a BWP, a CC, or a physical resource block set.

In the embodiments hereinafter, the case where a beam failure event occurs for one frequency domain bandwidth includes the case of detecting a beam failure event based on a beam failure detection reference signal corresponding to the frequency domain bandwidth.

In the embodiments hereinafter, one transmission occasion may be one PRACH occasion, a resource of a periodic uplink channel resource in one period, or a resource of a semi-periodic uplink channel resource in one period.

Embodiment One

In this embodiment, when a terminal needs to perform beam failure recovery processes of N CCs, one or more of the solutions below may be used. Here N is an integer greater than 1. For example, the N CCs are each of high frequency, and especially the beam correlation among the N CCs is relatively poor. When the intersection among time domain resources corresponding to the beam failure recovery processes of the N CCs is non-empty, one or more of the solutions below may be used.

In solution 1: As shown in FIG. 2, through detecting the beam failure detection reference signal set corresponding to the CC1, the terminal discovers that a beam failure event occurs for the CC1 at a moment t0 and thus transmits the first information corresponding to the CC1 to a base station. Here the first information includes at least one of the following information: the index of a CC (that is, the CC1), the index of an active BWP currently in the CC1, the index of a BWP in the CC1 where beam failure occurs for the BWP, or the indication information of a new reference signal selected from the candidate reference signal set corresponding to the CC1.

After the first information is transmitted, the response information (that is, the beam failure response information) for the transmitted first information of the CC1 is monitored in the beam failure recovery search space corresponding to the CC1 from a moment t2. For example, when the DCI scrambled by a C-RNTI/MCS-C-RNTI is heard in the beam failure recovery search space corresponding to the CC1 at a moment t4, it indicates that the beam failure recovery process corresponding to the CC1 is completed.

In a period from t2 to t4, the demodulation reference signal of the PDCCH in the beam failure recovery search space corresponding to the CC1 and the demodulation reference signal of the PDSCH scheduled by the PDCCH in the beam failure recovery search space corresponding to the CC1 satisfy the quasi co-location relationship with the reference signal corresponding to the reference signal indication information included in the first information corresponding to the CC1.

The preceding is the beam failure recovery process of the CC1. As shown in FIG. 2, in the beam failure recovery process of the CC1, through detecting the beam failure detection reference signal set corresponding to a CC2, the terminal discovers that a beam failure event occurs for the CC2 at a moment t1 between the moment t0 and the moment t2 and reports the first information corresponding to the CC2 to the base station. From a moment t3 to a moment t5, the terminal detects the DCI scrambled by the C-RNTI/MCS-C-RNTI. For example, when the DCI is detected at the moment t5, it indicates that the beam failure recovery process corresponding to the CC2 is completed.

In solution 1, the terminal performs N beam failure recovery processes in one period.

Although N beam failure recovery processes may be performed simultaneously, the first information corresponding to a CC corresponding to only one uplink beam failure request resource can be transmitted on the uplink beam failure request resource at one moment. Accordingly, when the intersection among time domain resources occupied by N beam failure request resources corresponding to N frequency domain bandwidths is non-empty, one or more of solutions 1.1 to 1.4 below need to be used. Here each beam failure request resource of the N beam failure request resources corresponds to the information corresponding to one CC of the N CCs.

In solution 1.1, one beam failure request resource is selected from the N beam failure request resources, and the first information corresponding to the CC corresponding to the beam failure request resource is transmitted on the selected beam failure request resource.

One beam failure request resource may by selected from the N beam failure request resources based on at least one of the following information: the priority of a CC, a parameter of a CC, the number of times for transmitting the first information corresponding to a CC (that is, the current value of the first information transmission counter corresponding to the CC), a parameter of a beam failure request resource, the signaling information notified by the base station, information about whether a CC includes a SPcell, time advance information, or information about whether a frequency domain bandwidth is in the response information monitoring stage currently.

Here a parameter of a CC includes at least one of the index of the CC, the frequency domain bandwidth magnitude of the CC, the frequency domain bandwidth of an active BWP in the CC, the subcarrier spacing of an active BWP in the CC, the frequency domain bandwidth of one BWP in the CC where a beam failure event occurs for the BWP, or the subcarrier spacing of one BWP in the CC where a beam failure event occurs for the BWP. For example, a greater frequency domain bandwidth indicates a higher priority.

Here a parameter of a beam failure request resource includes at least one of a frequency domain parameter, a time domain parameter, a power parameter, or a period length. For example, a beam failure request resource with a lower transmission power currently is selected preferentially and a beam failure request resource with a shorter period is selected preferentially since a shorter period indicates that the base station wants this CC to be recovered as soon as possible. Alternatively, a resource with a longer period may be selected preferentially since the resource with the shorter period may be transmitted next time.

For example, when a Pcell (or a PScell in a serving cell group (SCG)) is included in the N CCs, the SPcell is preferentially selected (that is, the preceding PCell or the PSCell). When no SPcell is included in the N CCs, the CC with the lowest index of a CC is selected; alternatively, the selection is made based on the indices of the CCs; for example, the CC with the highest index or the CC with the lowest index is selected. In this case, it is necessary to ensure that the SPcell can be selected preferentially.

In the preceding description, one beam failure request resource is selected from the N beam failure request resources. This embodiment does not exclude selecting one CC from the N CCs and then transmitting the first information corresponding to the selected CC on a beam failure request resource not included in the N beam failure request resources. In this case, although the first information corresponding to the CC is transmitted on the beam failure request resource, the base station knows that beam failure events occur for more than one CC at this time.

Although one beam failure request resource is selected for transmission at a moment of a collision, the first information corresponding to a CC not transmitted may be transmitted in the next period since the N beam failure processes are performed simultaneously and the N beam failure request resources occur periodically. When the intersection among time domain resources of N beam failure request resources in the transmission occasion of the next beam failure request information is empty, these beam failure request resources may be transmitted directly. When the intersection among time domain resources of N beam failure request resources in the transmission occasion of the next beam failure request information is non-empty, one of these beam failure request resources may be selected for transmission based on at least one of the following information: the priority of a CC, the index of a CC, a parameter of a CC, the number of times for transmitting the first information corresponding to a CC, a parameter of a beam failure request resource, the signaling information notified by the base station, information about whether a CC includes a SPcell, time advance information, or information about whether a frequency domain bandwidth is in the response information monitoring stage currently. This is similar to the preceding selection process. As shown in FIG. 3, from t5, a beam failure event occurs for each of the CC1, the CC2, and the CC3. At t5, the CC1 with the shortest period and the smallest index is selected. Although the CC1 has a transmission occasion of the beam failure request resource at each of a moment t6 and a moment t8, beam failure request information does not need to be transmitted since the beam failure recovery process of the CC1 is still in the response stage for monitoring the base station. Only the beam failure request resource of the CC2 occurs at a moment t7 and a moment t11; accordingly, the beam failure request information corresponding to the CC2 may be transmitted on the beam failure request resource of the CC2. At a moment t9, each of the CC1 the CC2, and the CC3 needs to transmit beam failure request information; according to selection principles, the beam failure request information of the CC1 is selected for transmission. At a moment t13, each of the CC1 the CC2, and the CC3 needs to transmit beam failure request information; according to selection principles, the beam failure request information of the CC3 is selected for transmission. In FIG. 3, the bold lines represent the beam failure request resources selected by the terminal.

In solution 1.2, the terminal does not want a non-empty intersection among the time domain resources occupied by the N beam failure request resources. For example, when the N beam failure request resources are beam failure request resources, the terminal does not want preambles associated with the first information corresponding to more than one CC to be transmitted on one PRACH occasion; alternatively, when the N beam failure request resources are PUCCH beam failure request resources, scheduling request (SR) beam failure request resources, or PUSCH beam failure request resources, the terminal does to want a non-empty intersection among the time domain resources that are occupied by the PUCCHs corresponding to different CCs, the SRs corresponding to different CCs. or the PUSCHs corresponding to different CCs. That is, the intersection among the beam failure request resources corresponding to different CC is empty.

In solution 1.3, one beam failure request resource is selected from beam failure request resources not included the N beam failure request resources according to the signaling information and/or a predetermined rule, and more than one pieces of first information among the first information corresponding to the N CCs are transmitted on the selected beam failure request resource. For example, one preamble, one PUCCH beam failure request resource, one SR beam failure request resource, or one PUSCH beam failure request resource corresponds to the first information corresponding to more than one CC. For example, one preamble corresponds to {the indication information of one reference signal of the CC1, the indication information of one reference signal of the CC2, the indication information of one reference signal of the CC3}. After receiving this preamble, the base station knows that a beam failure event occurs for each of the CC1, the CC2, and the CC3: and the terminal selects a reference signal corresponding to the indication information of the reference signal from a candidate reference signal set corresponding to each of the CC1, the CC2 and the CC3. Alternatively, one preamble corresponds to {the indication information of one reference signal of the CC1, the index of the CC2, the index of the CC3}. After receiving this preamble, the base station knows that a beam failure event occurs for each of the CC1, the CC2, and the CC3: and the terminal selects a reference signal corresponding to the indication information of the reference signal from the candidate reference signal set corresponding to the CC1.

In solution 1.4, the terminal independently determines that the first information of a CC corresponding to one beam failure request resource of the N beam failure request resources is transmitted on the beam failure request resource.

Figure 4:
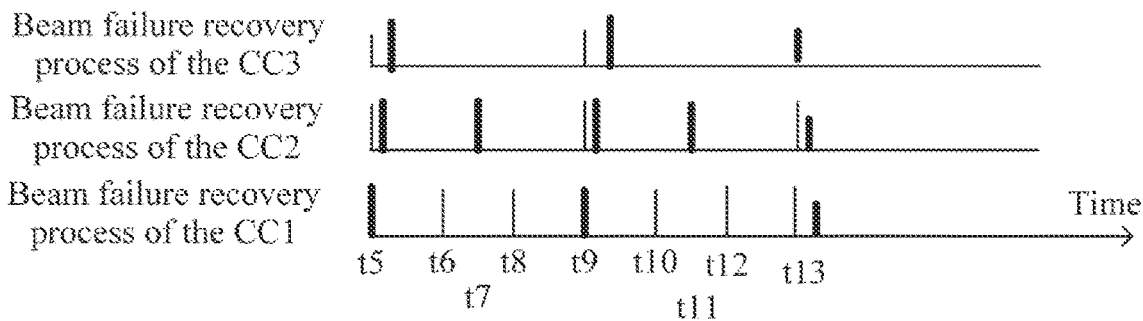
FIG. 4 is a diagram illustrating that a union of beam failure recovery resources that occupy time domain resources having a non-empty intersection and belong to the CCs is divided into M beam failure request resources in time division so as to transmit the first information of M frequency domain bandwidths when beam failure recovery processes of the CCs are performed simultaneously according to embodiments of the present disclosure.

In solution 1.5, the time domain resources corresponding to the N beam failure request resources are divided into M beam failure request resources in time division: the first information corresponding to M CCs is transmitted sequentially on the divided M beam failure request resources, where M may be a positive integer smaller than or equal to N; and at least one of the following information is determined based on the signaling information and/or the predetermined rule: the division method for dividing the time domain resources corresponding to the N beam failure request resources into M beam failure request resources in time division, the selection method for selecting M CCs from the N CCs, and the selection of the correspondence relationship between the selected M CCs and the M beam failure request resources in time division. As shown in FIG. 4, at the moment t5, the moment t9, and the moment t13, the intersection among the time domain resources occupied by the beam failure request resources of the CC1, the CC2, and the CC3 is non-empty. Accordingly, at each of the moment t5, the moment 19, and the moment t13, three resources of time division may be selected to report the beam failure request information of the CC1, the CC2, and the CC3 sequentially.

The N beam failure request resources of the preceding N CCs may be located in different CCs. Alternatively, the N beam failure request resources of the preceding N CCs may be located in one CC: in this case, one CC includes beam failure request resources corresponding to more than one CC; for example, a Pcell includes the beam failure request resource of a Pcell and the beam failure request resource of a Scell. Here the first information corresponding to one CC is transmitted on the beam failure request resource of the CC.

The beam failure search spaces of the preceding N CCs may be located in different CCs or the same CC.

In solution 1, to solve the problem that a beam failure event occurs for each of the N CCs, the terminal is configured to perform N beam failure recovery processes or N PRACH process simultaneously in one period (for example, the first information is transmitted through a PRACH, that is, the correspondence relationship between the PRACH resource and a PRACH resource; in this case, the base station may acquire the first information based on a received PRACH resources). In the preceding solution, in the period from a moment after the terminal transmits a first piece of beam failure request information to a moment when the terminal determines that the beam failure request information is transmitted successfully, the terminal may further transmit a second piece beam failure request information and may monitor the response information of the first piece of beam failure request information and the response information of the second piece of beam failure request information simultaneously. The enhancement of terminal complexity may depend on terminal capability. Some terminals can support this function, while some terminals do not support this function.

The number of CCs each of which is configured with a beam failure recovery parameter is associated with and the maximum number of PRACH processes performed simultaneously at one moment. For example, the number of CCs each of which is configured with a beam failure recovery parameter is 3; then a maximum of 3 PRACH processes are performed simultaneously at one moment. For example, before hearing the response information of the base station, the terminal may transmit more than one preamble, and/or the terminal needs to monitor the determination information corresponding to each preamble that is transmitted.

In solution 2, the terminal can perform only one PRACH process/beam failure recovery process at any time point.

Here the time domain resource corresponding to a beam failure recovery process includes at least one of a period from detecting a beam failure event to hearing beam failure response information, a period from detecting a beam failure event to stopping monitoring a period of a control channel in a beam failure search space, a period from transmitting the first information corresponding to a frequency domain bandwidth to hearing beam failure response information, a period from transmitting the first information to stopping monitoring a control channel in a beam failure search space, an operation period of a beam failure recovery timer, or an operation period of a beam failure response information monitoring timer. In this case, one or more of the solutions 2.1 to 2.3 may be used for solving the problem that a beam failure event occurs for each of a plurality of CCs.

In solution 2.1, the beam failure recovery process of one CC is selected from the beam failure recovery processes of the N CCs; the beam failure recovery process of the selected CC is performed; and beam failure recovery processes of the unselected CCs are terminated or suspended.

The step in which the beam failure recovery process of one CC is selected from the beam failure recovery processes of the N CCs may be performed based on at least one of the following information: the priority of a CC, a parameter of a CC, the number of times for transmitting the first information corresponding to a CC, a parameter of a beam failure request resource, a parameter of the beam failure request resource corresponding to a CC, the signaling information notified by the base station, information about whether a CC includes a SPcell, time advance information, or information about whether a CC is in the response information monitoring stage currently.

Here a parameter of a CC includes at least one of the index of the CC, the frequency domain bandwidth of the CC, the frequency domain bandwidth of an active BWP in the CC, the subcarrier spacing of an active BWP in the CC, the frequency domain bandwidth of one BWP in the CC where a beam failure event occurs for the BWP, or the subcarrier spacing of one BWP in the CC where a beam failure event occurs for the BWP. For example, a greater frequency domain bandwidth indicates a higher priority.

A parameter of a beam failure request resource includes at least one of a frequency domain parameter, a time domain parameter, a power parameter, or a period length. For example, a beam failure request resource with a lower transmission power currently is selected preferentially, and a beam failure request resource with a shorter period is selected preferentially.

For example, when a Pcell (or a PScell in an SCG) is included in the N CCs, the SPcell is preferentially selected (that is, the preceding PCell or the PSCell). When no SPcell is included in the N CCs, the CC with the lowest index of a CC is selected; alternatively, the selection is made based on the indices of the CCs; for example, the CC with the highest index or the CC with the lowest index is selected. In this case, it is necessary to ensure that the SPcell can be selected preferentially.

In the preceding description, one beam failure recovery process is selected from the N beam failure recovery processes. In the process in which the beam failure recovery process of a CC with a lower priority is being performed, when a beam failure event is discovered to occur a CC with a higher priority, the beam failure recovery process of the CC with the lower priority may be terminated or suspended and the beam failure recovery process of the CC with the higher priority is performed first: after the beam failure recovery process of the CC with the higher priority is completed, the beam failure recovery process of the CC with the lower priority is performed. For example, in the process in which the beam failure recovery process of a Scell is being performed, when a beam failure event occurs for a Pcell, the beam failure recovery process of the Scell may be terminated or suspended and the beam failure recovery process of the Pcell is performed first; after the beam failure recovery process of the Pcell is completed, the beam failure recovery process of the Scell is performed. Here the step in which the beam failure recovery process of one CC is suspended or terminated includes the step of suspending or terminating at least one of the following timers corresponding to the beam failure recovery process of the CC: a beam failure timer, a beam failure response information monitoring timer, a beam failure detection timer, or a beam failure request information transmission counter (that is, the first information transmission counter).

In solution 2.2, M beam failure recovery processes are selected from the N beam failure recovery processes; the selected M beam failure recovery processes are combined into one beam failure recovery process; and the combined beam failure recovery process is performed.

In performing the combined beam failure recovery process, the first information corresponding to M CCs are transmitted on the beam failure request resources. For example, one preamble corresponds to the first information corresponding to more than one CC; alternatively, one PUCCH/PUSCH/SR beam failure recovery resource corresponds to the first information corresponding to more than one CC. For example, one preamble corresponds to the following information: {the indication information of one reference signal of the CC1, the indication information of one reference signal of the CC2, the indication information of one reference signal of the CC3}, the frequency domain bandwidth of one BWP in a CC where a beam failure event occurs for the BWP, and the subcarrier spacing of one BWP in a CC where a beam failure event occurs for the BWP: alternatively, one preamble corresponds to {the indication information of one reference signal of the CC1, the index of the CC2, the index of the CC3}. After receiving this preamble, the base station knows that a beam failure event occurs for each of the CC1, the CC2, and the CC3; and the terminal selects a reference signal corresponding to the indication information of the reference signal from the candidate reference signal set corresponding to the CC1.

Figure 5:
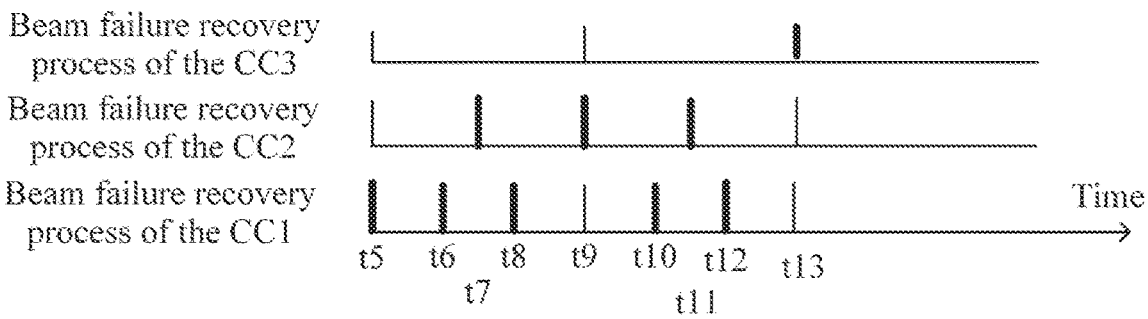
FIG. 5 is a diagram illustrating that one beam failure request resource is selected from a union of beam failure request resources of the M frequency domain bandwidths for transmitting the combined beam failure request information when beam failure recovery processes of the M frequency domain bandwidths are combined into one beam failure recovery process according to embodiments of the present disclosure.

A beam failure recovery resource of the combined beam failure recovery process may be selected from a union of the beam failure request resources corresponding to the N or M frequency domain bandwidths. As shown in FIG. 5, the period of the beam failure request resource of the CC1 is 1 ms; the period of the beam failure request resource of the CC2 is 1.5 ms; and the period of the beam failure request resource of the CC3 is 3 ms. At the moment t5, a beam failure event occurs for each of {CC1, CC2, CC3}. The beam failure recovery processes of {CC1, CC2, CC3} are combined into one beam failure recovery process. Each of the beam failure request resources corresponding to {CC1, CC2, CC3} may be used for transmitting the beam failure request information of the combined beam failure recovery process, while in a transmission occasion of each piece of beam failure request information, one beam failure request resource is needed to correspond to {the first information corresponding to the CC1, the first information corresponding to the CC2, the first information corresponding to the CC3}. For example, at each of the moment t5, the moment t9, and the moment t13, each of the beam failure request resources of the 3 CCs may be used for transmitting the beam failure request information of the combined beam failure recovery process. That is, in FIG. 5, at each of the moment t5, the moment t9, the terminal selects one of the beam failure request resources that correspond to {the first information corresponding to the CC1, the first information corresponding to the CC2, the first information corresponding to the CC3} and are among the beam failure request resources of the CCs for transmission. When the beam failure request resource of only one CC among the beam failure request resources of the three CCs may correspond to {the first information corresponding to the CC1, the first information corresponding to the CC2, the first information corresponding to the CC3}, the beam failure request information is transmitted on this beam failure request resource. After transmission, the base station knows in each of which CCs a beam failure event occurred and/or the new beam selected by the terminal for each of the CCs on which a beam failure event occurs.

In the preceding description, the information of more than one CC is transmitted on one beam failure recovery request resource. This embodiment does not exclude the case where the first information of the N CCs is transmitted sequentially on more than one beam failure request resource. The first information of the N CCs corresponds to one or more pieces of beam failure determination information.

In the next transmission occasion of beam failure request information, beam failure request resources corresponding to the first information corresponding to M CCs are selected. For example, in one PRACH occasion, mappings in Tables 1 and 2 are acquired through preceding higher-layer signaling. In this case, a preamble 2 is selected from the beam failure request resource set corresponding to the CC1 (where each beam failure request resource corresponds to (a time domain resource, a frequency domain resource, and a preamble)) for transmission. A preamble 2 is selected from the beam failure request resource set corresponding to the CC2 for transmission. That is, a preamble corresponding to the indices of a plurality of CCs is selected for transmission. After a beam failure event occurs for each of the N CCs, M CCs are selected so as to reduce resource losses, where M is a positive integer smaller than or equal to N. Otherwise, the base station needs to establish the correspondence relationship between any two or more CCs and beam failure request resources. Alternatively, the base station needs to establish the correspondence relationship between candidate reference signals of any two or more CCs and the beam failure request resources, leading to a relatively high demand for beam failure request resources. That is, beam failure request information is transmitted in an implicit manner. Based on the correspondence relationship between resources and beam failure request information, the terminal selects a resource for transmission, and the base station may know the corresponding beam failure request information after receiving the resource transmitted by the terminal. Since the combinations of CCs where beam failure events occur are different and the selected reference signal in each CCs is different, for each CC combination, each selected reference signal combination needs to correspond to a beam failure request resource. Accordingly, the demand for beam failure request resources is relatively high since different CC combinations and different reference signal combinations correspond to different beam failure request resources.

TABLE 1

| Preamble | Information |
|---|---|
| Preamble1 | CC1 |
| Preamble2 | CC1, CC2 |

TABLE 2

| Preamble | Information |
|---|---|
| Preamble1 | CC2 |
| Preamble2 | CC1, CC2 |

In solution 2.3, the terminal independently selects one beam failure request process among the N beam failure request processes.

Solutions 1.1 to 1.5 are to solve the problem of a collision of N beam failure request resources and enable more than one beam failure recovery process or PRACH process corresponding to different CCs or BWPs respectively to be performed in one period. Solutions 2.1 to 2.3 are to solve the problems of a collision of N beam failure recovery processes; and only one beam failure recovery process or PRACH process can be performed at one moment.

Embodiment Two

This embodiment describes a beam failure recovery process. A base station configures N sets of beam failure recovery parameters of a terminal. The N sets of beam failure recovery parameters correspond to different CCs/BWPs.

Here one set of beam failure recovery parameters includes at least one of a beam failure detection signal set, the maximum duration corresponding to a beam failure detection timer, a predetermined threshold value corresponding to a beam failure detection counter, a candidate reference signal set, the correspondence relationship between beam failure request information (that is, the first information) and a beam failure request resource, a beam failure search space, a predetermined threshold value corresponding to a beam failure request information transmission counter (that is, a first information transmission counter), or the maximum duration corresponding to a beam failure response information monitoring timer.

For example, a first set of beam failure recovery parameters correspond to a CC1 and a second set of beam failure recovery parameters correspond to a CC2. The beam failure recovery process includes the steps below.

In step one, beam failure is detected. The terminal detects a beam failure detection reference signal corresponding to each CC and determines whether a beam failure event occurs for each CC. The longest duration corresponding to a beam failure detection timer of each CC and the predetermined threshold value corresponding to a beam failure detection counter of each CC may be configured independently: alternatively, the longest duration corresponding to a beam failure detection timer of each CC and the predetermined threshold value corresponding to a beam failure detection counter of each CC may each use the same value and share a set of configuration.

In step two, a new beam is selected. The new beam of each CC is selected independently from the candidate reference signal set corresponding to each CC. When detecting a beam failure event, the terminal selects a reference signal $q_{new}$ for each CC from the candidate reference signal set corresponding to each CC. Here the link performance of a selected reference signal is higher than a predetermined value. Alternatively, a reference signal needs to be selected from the candidate reference signal set of each of some CCs. Some CCs do not have candidate reference signal sets, and the terminal may report the indices of the CCs first.

In step three, beam failure request information is transmitted. When a beam failure event is detected in one CC, a set CCs for each of which beam failure events occur and which has not been recovered successfully is determined. Accordingly, beam failure request information is transmitted by using one of the manners below.

In manner one for transmitting beam failure request information, beam failure request resources corresponding to the first information corresponding to the CC set are determined, and beam failure request information is transmitted on the determined resources. That is, the beam failure request resources correspond to the first information of a plurality of CCs in the CC set. For example, one preamble/PUCCH/SR/PUSCH resource corresponding to {the first information corresponding to the CC1, the first information corresponding to the CC2, the first information corresponding to the CC3} is selected for transmitting beam failure request information. Here the CC set includes {CC1, CC2, CC3}.

In manner two for transmitting beam failure request information, one subset of the CC set is selected. The first information in the subset has a corresponding beam failure request resource. For example, in the transmission occasion of the current beam failure request information, one preamble/PUCCH/SR/PUSCH resource corresponds to {the first information corresponding to the CC1, the first information corresponding to the CC2}; and then the beam failure request information is transmitted on the beam failure request resource.

In the preceding methods one and two for transmitting beam failure request information, when a beam failure event is discovered to occur for one CC, a beam failure recovery timer is started or restarted, a beam failure response information monitoring timer is started or restarted, and a first information transmission counter is set to 0. In this case, a plurality of CC share a beam failure recovery timer, a beam failure response information monitoring timer, and a first information transmission counter.

In manner three for transmitting beam failure request information, the first information corresponding to each CC is transmitted is transmitted in the beam failure request resource corresponding to each CC. That is, in this case, the first information corresponding to one CC of a plurality of CCs is transmitted in each beam failure request resource of a plurality of beam failure request resources. After the beam failure request information is transmitted for the first time on the beam failure request resource corresponding to each CC, the beam failure recovery timer corresponding to the CC, the beam failure response information monitoring timer corresponding to the CC, and the first information transmission counter corresponding to the CC are started. That is, each CC has a corresponding beam failure recovery timer, a corresponding beam failure response information monitoring timer, and a corresponding first information transmission counter.

In step four, beam failure response information is monitored. When different manners are used in step three, actions for monitoring beam failure response information are different.

In monitoring manner one, when manner one for transmitting beam failure request information or manner two for transmitting beam failure request information is used in step three, after transmitting the first information corresponding to the CC set on one beam failure request resource or transmitting the first information corresponding to a subset of the CC set on one beam failure request resource, the terminal monitors the response information of the base station. When no response information of the base station is heard in the predetermined period, step two is returned to.

In monitoring manner two, when manner three for transmitting beam failure request information is used in step three, for the beam failure request resource corresponding to each CC, the corresponding beam failure response information is monitored. After the beam failure request resource corresponding to each CC is transmitted, the response information monitoring timer corresponding to the CC is started. When no response information is heard in the operation period of the response information monitoring timer, step two is returned to.

In monitoring manner three, when manner three for transmitting beam failure request information is used in step three, for the beam failure request resource corresponding to each CC, the corresponding beam failure response information is monitored. A plurality of CCs share a beam failure response information monitoring timer. After a beam failure request resource is transmitted each time, the beam failure response information monitoring timer is started or restarted.

After the first information is transmitted on a beam failure request resource, the response information includes the DCI that is scrambled by a C-RNTI/MCS-C-RNTI and is transmitted in a beam failure recovery search space by the base station. When a beam failure recovery time or a beam failure response information monitoring timer detects the response information before timing out, it is considered that the beam failure request information is transmitted successfully, the beam failure recovery process is completed successfully, and the beam failure recovery timer and the beam failure response information monitoring timer are stopped. Otherwise, when no response information of the base station is detected in the predetermined time, step two is returned to. When the beam failure recovery timer times out or the number of times for transmitting the beam failure request information exceeds a predetermined threshold, it is considered that the beam failure request information is not transmitted successfully, and the indication information that the beam failure request information is not transmitted successfully is transmitted to a higher layer.

When beam failure recovery is performed for N CCs, the determination of the QCL relationship corresponds to each CC separately. For example, in the period from a first predetermined moment after the beam failure request information corresponding to CCi, where i=1 or 2 (that is, the beam failure request information of a plurality of CCs may be transmitted on one beam failure request resource, alternatively, the beam failure request information of a plurality of CCs may be transmitted on a plurality of beam failure request resources, and each beam failure request resource includes the beam failure request resource of one CC) to a moment before the reconfiguration or activation information of a quasi co-location reference signal of a PDCCH of the CCi is received, a demodulation reference signal of a control channel in the beam failure recovery search space of the CCi and a demodulation reference signal of a data channel scheduled by the control channel in the beam failure recovery search space of the CCi satisfy the QCL relationship with a reference signal $q_{new}$ corresponding to the beam failure request information corresponding to the CCi. That is, the determination of the QCL relationship is performed for each CC separately.

In step five, from a second predetermined moment after the response information of the beam request information of the corresponding CCi is received successfully from the base station to a moment before the activation or reconfiguration information of the spatial relationship indication information of the PUCCH of the CCi is received from the base station, a spatial filter of a beam failure detection reference signal that corresponds to the CCi and is transmitted by the terminal recently is used as a spatial filter on the CCi. From a third predetermined moment after the response information of the base station is received successfully, a demodulation reference signal of a CORESET 0 and the recently reported $q_{new}$ corresponding to the CC (for example, a Pcell) where the CORESET 0 is located satisfy a quasi co-location relationship.

At least one of the first predetermined moment, the second predetermined moment, or the third predetermined moment is acquired based on at least one of a subcarrier spacing of a BWP where the beam failure request resource for transmitting the beam failure request information corresponding to the CCi is located, a subcarrier spacing of an active BWP in the CCi, or a ratio of the subcarrier spacing of the active BWP in the CCi to the subcarrier spacing of the BWP where the beam failure request resource for transmitting the beam failure request information corresponding to the CCi is located.

Embodiment Three

In this embodiment, each of N CCs is configured with a beam failure detection reference signal set. That is, each CC of the N CCs corresponds to one beam failure detection reference signal set. Here N is an integer greater than 1. The beam failure detection reference signal set of a CC1 is a set 1. The beam failure detection reference signal set of a CC2 is a set 2. The beam failure detection reference signal set of a CC3 is a set 3. A terminal determines whether a beam failure event occurs for each CC by detecting the beam failure detection reference signal set of each CC. When a beam failure event is detected in one CC, the beam failure request information (also referred to as the first information) of the CC needs to be transmitted. Accordingly, two solutions below may be performed.

Figure 7:
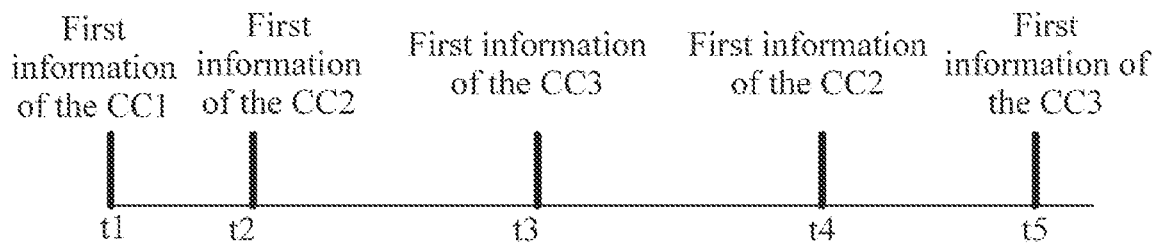
FIG. 7 is a diagram illustrating that each beam failure request resource corresponds to the first information corresponding to one CC when beam failure recovery processes of the CCs are performed simultaneously according to embodiments of the present disclosure.

In solution 1, different CCs correspond to different PRACH processes, and/or different CCs correspond to different beam failure timers. As shown in FIG. 7, at a moment t1, a beam failure event occurs for the CC1. Base on the configuration information of the beam failure request resource of the CC1, the terminal transmits the first information of the CC1 on the beam failure request resource of the CC1, starts the beam failure recovery timer of the CC1 and the beam failure response information monitoring timer of the CC1, and monitors the response information corresponding to the CC1.

At a moment t2, a beam failure event occurs for the CC2, and the response information corresponding to the CC1 is not received. Base on the configuration information of the beam failure request resource of the CC2, the terminal transmits the first information of the CC2 on the beam failure request resource of the CC2, starts the beam failure recovery timer of the CC2 and the beam failure response information monitoring timer of the CC2, and monitors the response information corresponding to the CC2.

At a moment t3, a beam failure event occurs for the CC3, and the response information corresponding to the CC1 and the response information corresponding to the CC2 are not received. Base on the configuration information of the beam failure request resource of the CC3, the terminal transmits the first information of the CC3 on the beam failure request resource of the CC3, starts the beam failure recovery timer of the CC3 and the beam failure response information monitoring timer of the CC3, and monitors the response information corresponding to the CC3.

At a moment t4, the response information of the first information of the CC1 transmitted at the moment t1 is received; the response information of the first information transmitted at the moment t2 and the response information of the first information transmitted at the moment t3 are not received; and the beam failure response signal monitoring timer started at the moment t2 has timed out. In this case, at the moment t4, the first information of the CC2 may be transmitted.

At a moment t5, the response information of the first information transmitted at the moment t3 is not received, and the beam failure response signal monitoring timer started at the moment t3 has timed out. In this case, at the moment t5, the first information of the CC3 may be transmitted In summary, each CC corresponds to one beam failure recovery-PRACH process and one beam failure timer; and in the beam failure recovery process of one CC, another beam failure recovery process may be started simultaneously.

In the preceding description, for each CC, the response information is monitored separately. This embodiment does not exclude that after the moment t3, the terminal may monitor the response information of a preamble transmitted separately at {t1, t2, t3} (for example, a base station receives only one of three preambles) or may monitor the total response information of the three preambles transmitted at {t1, t2, t3}, with the total response information included in one piece of response information from the base station. For example, preamble information is carried in the response information; alternatively, a beam failure search space 1 corresponds to the beam failure request information of the CC1, and a beam failure search space 2 corresponds to the beam failure request information of {CC1, CC2}.

In solution 2, the scenario is the same as solution 1, but only one beam failure recovery process exists at one moment.

Figure 6:
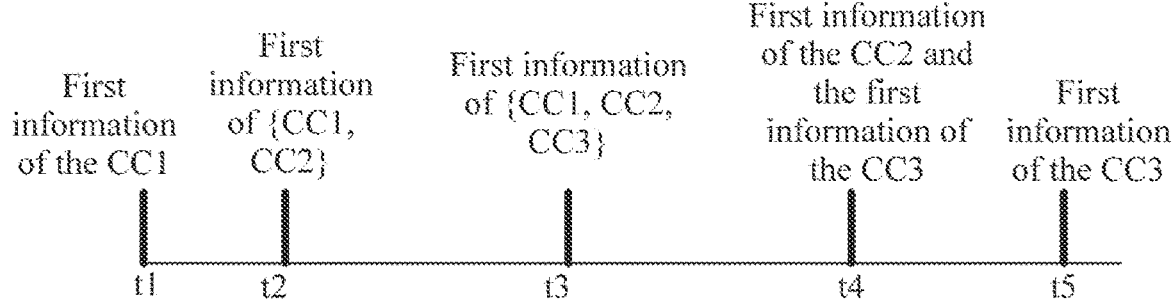
FIG. 6 is a diagram illustrating that one beam failure request resource corresponds to the first information corresponding to one CC set when beam failure recovery processes of a plurality of CCs are combined into one beam failure recovery process according to embodiments of the present disclosure.

As shown in FIG. 6, at the moment t2, a CC set {CC1, CC2} where a beam failure event occurs currently and a beam failure recovery process is not completed successfully is determined; one beam failure request resource corresponding to the first information of {CC1, CC2} is selected: and the beam failure request information is transmitted on the beam failure request resource. That is, in this case, one beam failure request resource corresponds to the beam failure request information of {CC1, CC2}. The beam failure response signal monitoring timer started at the moment t1 and/or the beam failure recovery timer started at the moment t1 is restarted and/or a PRACH transmission timer is set to 0 (that is, a first information transmission counter is set to 0).

At the moment t3, a CC set {CC1, CC2, CC3} where a beam failure event occurs currently and a beam failure recovery process is not completed successfully is determined, a beam failure request resource corresponding to the first information of {CC1, CC2, CC3} is selected; and the beam failure request information is transmitted on the beam failure request resource. That is, in this case, one beam failure request resource corresponds to the beam failure request information of {CC1, CC2, CC3}. The beam failure response signal monitoring timer started at the moment t2 and/or the beam failure recovery timer started at the moment t2 is restarted and/or a PRACH transmission timer is set to 0.

At the moment t4, a beam failure recovery process has been performed for the CC1 and the beam failure response signal monitoring timer started at the moment t3 has timed out; a beam failure request resource corresponding to the first information of {CC2, CC3} is selected; and the beam failure response signal monitoring timer is restarted. However, at this point, a beam failure recovery timer is not restarted and a PRACH transmission timer is not set to 0 since no beam failure event occurs for any CC.

At the moment t5, the response information of the first information of {CC1, CC2} transmitted at the moment t2 is received and {CC1, CC2} is deleted from {CC2, CC3}. Moreover, since the beam failure response signal monitoring timer started at the moment t4 has timed out, the first information of the CC3 may be transmitted In summary, in solution 2, when a beam failure event is detected in one new CC, one beam failure recovery process is started. When a beam failure recovery process is being performed, a set of CCs for each of which a beam failure event occurs currently and a beam failure recovery process is not completed successfully is determined; one or more beam failure request resource corresponding to the beam failure request information of the set are selected; the beam failure request information is transmitted on the one or more beam failure request resources; a beam failure response signal monitoring timer and/or a beam failure recovery timer is restarted; and/or a PRACH transmission timer is set to 0 (that is, a first information transmission counter is set to 0). When the response information of one CC/CC set is received, the CC is deleted from the CC set in the subsequent transmission of beam failure request information.

The preceding beam failure request resources where the beam failure request information of N CCs is located may be in different CCs or in the same CC. The preceding resources when the response information of the N CCs is located may be in different CCs or the same CC.

The beam failure request information (also referred to as the first information) corresponding to one CC includes at least one of the index of the CC, the index of a BWP, or the indication information of a reference signal in the candidate reference signal set corresponding to a beam failure detection reference signal set.

The preceding index of a feedback BWP is due to the fact that one CC may include a plurality of BWPs each of which corresponds to a beam failure detection reference signal set. Alternatively, beam failure request information may not include the index of a BWP and is appointed as the beam failure request information corresponding to an active BWP currently in the CC. Alternatively, it is appointed that a BWP where a beam failure request resource is located corresponds to a BWP where a beam failure detection reference signal is located. Alternatively, it is appointed that only one BWP in one CC has a beam failure detection reference signal. Alternatively, a beam failure detection reference signal of one CC include beam failure detection reference signal sets of all BWPs in the CC.

Beam failure request information may be transmitted through explicit signaling, for example, one uplink control channel includes the beam failure request information. Alternatively, the correspondence relationship between a beam failure request resource and beam failure request information may be determined based on the signaling information sent by the base station and/or a predetermined rule: in this case, the terminal may transmit a reference signal on the beam failure request resource directly and the base station may know the corresponding beam failure request information.

Embodiment Four

In a related standard, after beam failure request information is transmitted and before the reconfiguration or activation information of a quasi co-location reference signal of a PDCCH is received, a demodulation reference signal of a control channel in the beam failure recovery search space and a demodulation reference signal of a data channel scheduled by the control channel in the beam failure recovery search space satisfy the QCL relationship with a reference signal $q_{new}$ corresponding to the recently transmitted beam failure request information. However, the quasi co-location reference signal of the PDCCH may be received before the response information transmitted by a base station is heard successfully, and/or the received quasi co-location reference signal of the PDCCH may be an update of a quasi co-location reference signal of a PDCCH of another CC but not an update of a quasi co-location reference signal of a PDCCH of a CC corresponding to a beam failure detection reference signal set. In this case, after this update information is received, the demodulation reference signal of the control channel in the beam failure recovery search space and the demodulation reference signal of the data channel scheduled by the control channel in the beam failure recovery search space cannot satisfy the QCL relationship with the reference signal $q_{new}$. Thus a terminal and the base station cannot agree on how to acquire a quasi co-location reference signal of the demodulation reference signal of the control channel in the beam failure recovery search space and acquire a quasi co-location reference signal of the demodulation reference signal of the data channel scheduled by the control channel in the beam failure recovery search space. This makes response information unable to be issued; moreover, the terminal continues to transmit beam failure request information, resulting in unnecessary power losses of the terminal. Accordingly, in the period from a moment after the terminal transmits beam failure request information to a moment when one of the events below occurs, the demodulation reference signal of the control channel in the beam failure recovery search space and the demodulation reference signal of the data channel scheduled by the control channel in the beam failure recovery search space cannot satisfy the QCL relationship with the reference signal $q_{new}$.

In event one, after detecting at least one piece of DCI scrambled by an MCS-C-RNTI or a C-RNTI in a beam failure search space, the terminal receives an activation or update signaling of a quasi co-location reference signal of a PDCCH.

In event two, after detecting at least one piece of DCI scrambled by an MCS-C-RNTI or a C-RNTI in a beam failure search space, the terminal receives an activation or update signaling of a quasi co-location reference signal of a PDCCH in a BWP/CC corresponding to the beam failure detection reference signal set.

In event three, the terminal stops the detection of the control channel in the beam failure search space.

In the preceding description, the QCL relationship of the PDCCH in the beam failure search space and the QCL relationship of a PDSCH scheduled by the PDCCH in the beam failure search space are acquired based on $q_{new}$. It may be limited that when the PDSCH is a PDSCH in a CC corresponding to a beam failure detection reference signal, the QCL relationship is acquired based on $q_{new}$; and when the PDSCH is another PDSCH, the QCL relationship is not acquired based on $q_{new}$.

Embodiment Five

In this embodiment, the same piece of beam failure request information may be transmitted on a first-type resource or on a second-type resource. A terminal selects whether to transmit the same piece of beam failure request information on a first-type resource or on a second-type resource based on a predetermined rule.

Here a base station configures spatial relationship indication information for a first-type resource; that is, a spatial transmission filter of a first-type resource is acquired based on a reference signal indicated in the spatial relationship indication information; that is, a transmission beam of a first-type resource is determined and is controlled by the base station. For example, a first-type resource includes, for example, a PUCCH resource, an SR resource, or a PUSCH resource. The base station does not configure spatial relationship indication information for a second-type resource, and the terminal determines a spatial transmission filter of a second-type resource independently.

When no beam failure event occurs for a downlink CC corresponding to the CC where a first-type resource is located, beam failure request information is transmitted in the first-type resource. When a beam failure event occurs for a downlink CC corresponding to the CC where a first-type resource is located, beam failure request information is transmitted in a second-type resource.

Embodiment Six

This embodiment describes how to determine a transmission occasion of the first information corresponding to a first frequency domain bandwidth in a second frequency domain bandwidth and how to determine a PRACH occasion when the beam failure request resource of a CC1 (that is, the first frequency domain bandwidth) is a PRACH resource in a CC2 (that is, the second frequency domain bandwidth). The time-frequency resource (that is, the PRACH occasion) occupied by a PRACH resource corresponds to a synchronous signal block (SSB). Here different PRACH occasions (that is, the transmission opportunities of beam failure request information or the transmission opportunities of the first information) may be frequency-division multiplexed, time-division multiplexed, or code-division multiplexed. One PRACH occasion may include one or more preamble sequences. The preamble sequences are code-division multiplexed. Therefore, the following solutions may be provided.

In Alt1, the determination is made based on the configured transmission occasion index. To ensure that the beam failure request information of the CC1 can be reported, the configuration is preferably made for PRACHE occasions corresponding to all SSBs in the CC2 or for PRACH-occasions corresponding to SSBs corresponding to reference signals in a predetermined reference signal set of the CC2, where the predetermined reference signal set includes the beam failure detection reference signal set of the CC2 and/or a candidate reference signal set.

In Alt2: a PRACH occasion which belongs to the beam failure request information of the CC1 and is in the CC2 is determined based on the index of an SSB by configuring the correspondence relationship between (the beam failure request information of the CC1, indices of one or more SSBs of a CC in the next row corresponding to the CC2).

In the preceding solution, a PRACH occasion resource where the beam failure request resource of the CC1 is located and which is in the CC2 is determined through explicit signaling. This embodiment also does not exclude that when the PRACH-occasion resource where the beam failure request resource of the CC1 and which is in the CC2 is not configured, the PRACH-occasion resource where the beam failure request resource of the CC1 and which is in the CC2 is determined according to solution Alt3 or Alt4 below.

In Alt3, a PRACH-occasion resource corresponding to the beam failure request resource of the CC1 is acquired based on an SSB corresponding to one reference signal in the beam failure detection reference signal set corresponding to the CC2, where the link performance of the reference signal is higher than a predetermined threshold. If the beam failure reference signal set of the CC2 has no reference signal whose link performance is higher than the predetermined threshold, a reference signal whose link performance is higher than the predetermined threshold may be discovered in the candidate reference signal set of the CC2. The PRACH occasion is acquired based on the SSB corresponding to the reference signal.

In Alt4, a PRACH-occasion resource which belongs to the beam failure request resource of the CC1 and is in the CC2 is acquired based on an SSB corresponding to one reference signal in the candidate reference set of the CC1, where the link performance of the reference signal is higher than the predetermined threshold.

In Alt5, a PRACH-occasion which belongs to the beam failure request resource of the CC1 and is in the CC2 is acquired based on an SSB corresponding to the reference signal indication information included in the first information of the CCL.

In the preceding description, an SSB corresponding to one reference signal includes an SSB in the QCL relationship with the reference signal.

Embodiment Seven

In this embodiment, to solve the problem that a beam failure event occurs for a Pcell but no beam failure event is detected in a Scell, at least one of the solutions below may be performed.

In solution 1, the Scell includes the beam failure request resource of the Pcell in Shell; both the Pcell and Scell include the Scell includes the beam failure request resource of the Pcell; for example, through the signaling information and/or a predetermined rule, the correspondence relationship among (one reference signal in the candidate reference signal set of the Pcell, the beam failure request resource in the Scell, the beam failure request resource in the Pcell) (That is, one piece of first information corresponds to H-types of beam failure request resources, and the H-types of beam failure request resources includes the beam failure request resource in the Scell and the beam failure request resource in the Pcell.) is determined. That is, one candidate reference signal corresponds to uplink beam failure request resources in more than one CC. When a beam failure event occurs for the Pcell but no beam failure event occurs for the Scell, the beam failure request information of the Pcell is transmitted in the beam failure request resource of the Scell. When a beam failure event occurs for the Scell at this point, one of the beam failure request resources of the Pcell or the beam failure request resource of the Scell is selected for transmitting the beam failure request information of the Pcell. In the preceding description, one candidate reference signal of the Pcell corresponds to uplink beam failure request resources in more than one CC. This embodiment does not exclude the implementation in which one candidate reference signal of one Scell corresponds to uplink beam failure request resources in more than one CC.

In solution 2, a base station updates a Pcell to a Scell through a MAC-CE/DCI.

Embodiment Eight

This embodiment describes a solution of how to configure beam failure recovery resources by a signaling when one CC includes beam failure recovery resources of F CCs. Here a beam failure recovery resource includes at least one of a beam failure request resource or a beam failure search space resource. Especially, a beam failure request resource is a PRACH resource. A CC1 includes PRACH beam failure request resources of {CC1, CC2, CC3}.

In configuration manner 1, the F CCs correspond to F sets of first-type beam failure recovery parameter information and F sets of second-type beam failure recovery parameter information, and beam failure recovery parameters of the F CCs are configured independently from each other with no limit among the parameters.

Figure 8:
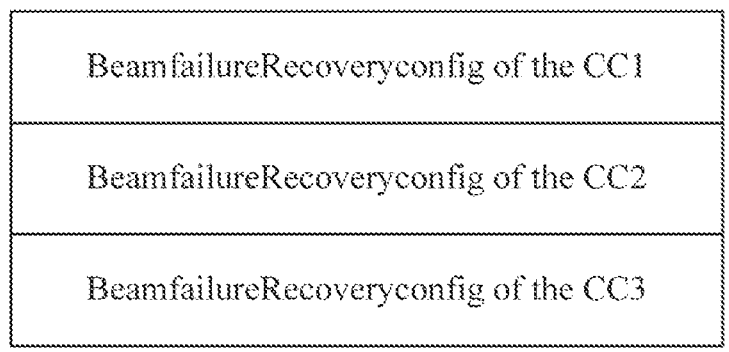
FIG. 8 is diagram one illustrating the configuration of beam failure request parameters that correspond to F CCs and are in one CC according to embodiments of the present disclosure.

As shown in FIG. 8, the configuration information of the beam failure recovery parameters (hereinafter referred to as BeamfailureRecoveryconfig) includes a first-type beam failure recovery parameter and a second-type beam failure recovery parameters. That is, the BeamfailureRecoveryconfig in FIG. 8 is for each CC of the F CCs. Here the BeamfailureRecoveryconfig includes a PRACH generic, the configuration of a starting preamble of a PRACH, the detection threshold value for a beam failure detection reference signal, the correspondence relationship between a candidate reference signal and a preamble resource, the correspondence relationship between an SSB and a PRACH occasion, the index information of a PRACH occasion in a PRACH occasion set corresponding to one SSB, a beam failure search space, and a beam failure recovery timer.

Here a PRACH generic includes the following configuration: the format information of a preamble included in the PRACH, the frequency domain resource of the PRACH occasion, the target received power of the PRACH, the maximum transmitted power of the preamble, the power ramping step, the duration of a beam failure response information monitoring timer transmitted by a base station, the cyclic shift information of the preamble, the maximum duration corresponding to a beam failure detection timer, and the maximum number of times corresponding to a beam failure detection counter.

Figure 9:
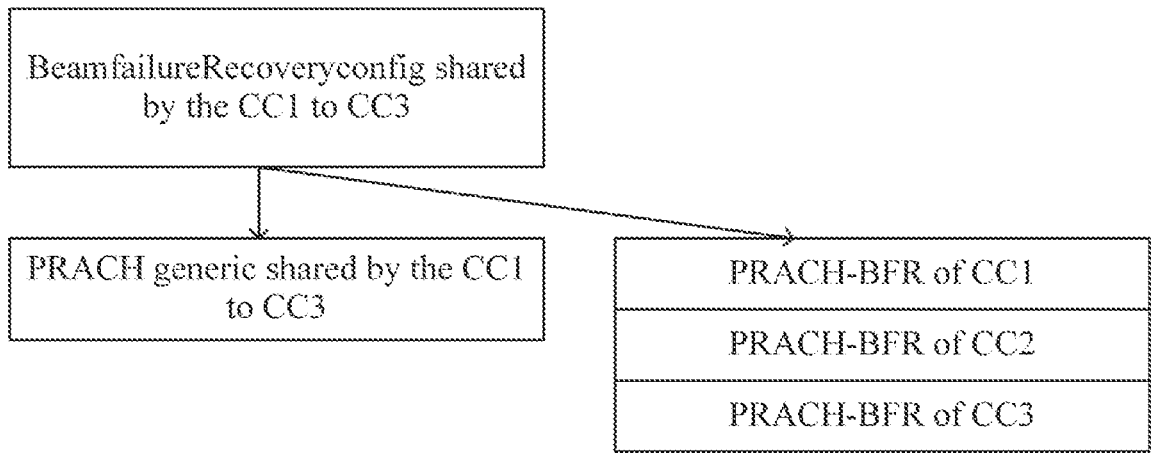
FIG. 9 is diagram two illustrating the configuration of beam failure request parameters that correspond to the F CCs and are in one CC according to embodiments of the present disclosure.

In configuration manner two, the F CCs correspond to one set of PRACH generic configuration information (that is, first-type beam failure recovery parameters), and F sets of other configuration information (that is, second-type beam failure recovery parameters) in the BeamfailureRecoveryconfig are configured and correspond to the F CCs respectively, as shown in FIG. 9.

As described in Embodiment 1, when one preamble corresponds to the first information of a plurality of CCs, the transmission power of this preamble may be enhanced; that is, in the case of no special configuration, the target received power of each preamble is the same. Each of some preambles may be configured with a target received power. For example, one preamble corresponds to the first information of a plurality of CCs, indicating that a beam failure event occurs for each of the CCs; then the target received power of this preamble may be configured independently. Alternatively, the target received power of a preamble may be determined based on the number of CCs corresponding to the beam failure request information corresponding to the preamble.

In the preceding configuration manners one and two, the correspondence relationship between the F CCs and F sets of first-type beam failure recovery parameters and/or F sets of second-type beam failure recovery parameters needs to be established based on the signaling information and/or a predetermined rule.

When a CC1 includes a plurality of BWPs and the beam failure recovery resource of the CC1 is included in a CC2, each BWP in the CC1 needs to be configured with one set of first-type beam failure recovery parameters and F sets of second-type beam failure recovery parameters in the CC2. In this case, the correspondence relationship between F*Z BWPs and F*Z sets of first-type beam failure recovery parameters and/or F sets of second-type beam failure recovery parameters is required. In the preceding description, each CC includes Z BWPs. This embodiment does not exclude that the number of BWPs in each CC is not the same.

Figure 10:
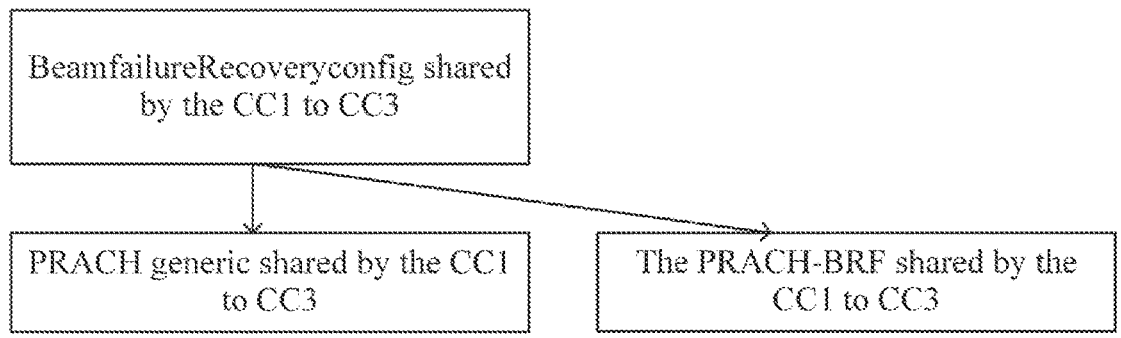
FIG. 10 is diagram three illustrating the configuration of beam failure request parameters that correspond to the F CCs and are in one CC according to embodiments of the present disclosure.

In configuration manner three, the F CCs correspond to one set of PRACH generic configuration information (that is, first-type beam failure recovery parameters), and the N CCs share one set of information (that is, second-type beam failure recovery parameters) other than the candidate reference signal information in the BeamfailureRecoveryconfig. As shown in FIG. 10, the N CCs share one set of configuration information BeamfailureRecoveryconfig, while the index information of a CC where a candidate reference signal is located is included in the correspondence relationship between a candidate reference signal set and a preamble.

A second-type beam failure recovery parameter may further include a beam failure detection reference signal set. A first-type beam failure recovery parameter may further include the maximum duration corresponding to a beam failure detection timer and the maximum number of times corresponding to a beam failure detection counter.

Embodiment Nine

The beam failure request resource of a CC1 is in a CC2. In the case where the CC2 includes more than one BWP, the solutions below may be used to ensure that the beam failure request information of the CC1 is reported to a base station.

In solution one, each BWP in the CC2 includes the beam failure request resource of the CC1. When a beam failure event occurs for the CC1, the beam failure request information of the CC1 is transmitted in a BWP activated by the CC2 currently.

In solution two, part of the BWPs in the CC2 include the beam failure request resource of the CC1. When a beam failure event occurs for the CC1, a BWP of the CC2 is switched to, with the BWP including the beam failure request resource. When a plurality of BWPs satisfy the condition, a predetermined BWP, for example, the BWP with the lowest index of a BWP, is switched to.

Another embodiment of the present disclosure provides an apparatus for a beam failure recovery. The apparatus includes a first beam failure recovery module.

The first beam failure recovery module is configured to, in response to a non-empty intersection existing among time domain resources corresponding to beam failure recovery processes of N frequency domain bandwidths, perform any one of method one for beam failure recovery, method two for beam failure recovery, and method three for beam failure recovery. In method one for beam failure recovery, the beam failure recovery process of one frequency domain bandwidth is selected among the beam failure recovery processes of the N frequency domain bandwidths; the beam failure recovery process of the selected frequency domain bandwidth is performed; and beam failure recovery processes of the unselected frequency domain bandwidths are terminated or suspended. In method two for beam failure recovery, the beam failure recovery processes of the N frequency domain bandwidths are combined into one beam failure recovery process and the combined beam failure recovery process is performed. In method three for beam failure recovery, the beam failure recovery processes of the N frequency domain bandwidths are performed simultaneously.

Here the case where the non-empty intersection exists among the time domain resources corresponding to the beam failure recovery processes of the N frequency domain bandwidths refers to the case where a non-empty intersection exists among time domain resources corresponding to beam failure recovery processes of N1 frequency domain bandwidths among the N frequency domain bandwidths. Here N1 is an integer greater than or equal to 1 or smaller than or equal to N.

In the preceding method one for beam failure recovery, the first beam failure recovery module may use any method for performing the step in which the beam failure recovery process of one frequency domain bandwidth is selected among the beam failure recovery processes of the N frequency domain bandwidths. The implementation method is not used for limiting the protection scope of embodiments of the present disclosure. For example, the first beam failure recovery module is specifically configured to use at least one of the manners below to perform the step in which the beam failure recovery process of one frequency domain bandwidth is selected among the beam failure recovery processes of the N frequency domain bandwidths.

The beam failure recovery process of one frequency domain bandwidth among the beam failure recovery processes of the N frequency domain bandwidths is selected based on the second information; in response to a beam failure event occurring in a primary cell (Pcell) and a beam failure event occurring in a secondary cell (Scell), the beam failure recovery process of the Pcell is selected and the beam failure recovery process of the Scell is suspended or terminated; or in response to a beam failure event occurring in one Scell and in response to the beam failure recovery process of another Scell being performed, a communication node determines independently that the beam failure event of either of the two Scells is performed. Here one cell corresponds to one frequency domain bandwidth.

In the preceding method one for beam failure recovery, the step in which beam failure recovery processes of the unselected frequency domain bandwidths are terminated or suspended includes at least one of the steps below.

Beam failure timers corresponding to the unselected frequency domain bandwidths are suspended or terminated; or first information transmission counters corresponding to the unselected frequency domain bandwidths are set to a predetermined value. Here a beam failure timer includes at least one of a beam failure recovery timer or a beam failure response information monitoring timer.

Here the second information includes at least one of the priority of a frequency domain bandwidth, a parameter of a frequency domain bandwidth, the number of times for transmitting the first information corresponding to a frequency domain bandwidth, a parameter of the beam failure request resource corresponding to a frequency domain bandwidth, the received signaling information, the information about whether a frequency domain bandwidth includes a special cell (Spcell), timing advance information, or the information about whether the beam failure recovery process corresponding to a frequency domain bandwidth is in a response information monitoring stage currently.

Here a parameter of a frequency domain bandwidth includes at least one of the frequency domain bandwidth index, the frequency domain bandwidth magnitude, the frequency domain bandwidth of an active bandwidth part (BWP) in the frequency domain bandwidth, the subcarrier spacing of an active BWP in the frequency domain bandwidth, the frequency domain bandwidth of one BWP in the frequency domain bandwidth where a beam failure event occurs for the BWP, or the subcarrier spacing of one BWP in the frequency domain bandwidth where a beam failure event occurs for the BWP.

Here a parameter of a beam failure request resource includes at least one of a frequency domain parameter, a time domain parameter, a power parameter, or a period length.

In the preceding method two for beam failure recovery, the first beam failure recovery module is specifically configured to use at least one of the manners below to perform the step in which the beam failure recovery processes of the N frequency domain bandwidths are combined into one beam failure recovery process and the combined beam failure recovery process is performed.

The N frequency domain bandwidths correspond to one beam failure timer; the N frequency domain bandwidths correspond to one first information transmission counter: only one beam failure timer is caused to operate at one time point: a beam failure recovery timer is started or restarted in response to a beam failure event occurring in one frequency domain bandwidth; the first information transmission counter is set to 0 in response to a beam failure event occurring in one frequency domain bandwidth; a beam failure response information monitoring timer is started or restarted after the first information corresponding to one frequency domain bandwidth set is transmitted; in response to requiring the transmission of the first information corresponding to one frequency domain bandwidth, a frequency domain bandwidth set is determined and a beam failure event occurs currently and has not been recovered successfully for each frequency domain bandwidth in the frequency domain bandwidth set, one or more beam failure request resources are selected based on the determined frequency domain bandwidth set, and the first information corresponding to the frequency domain bandwidth set is transmitted on the one or more beam failure request resources: in response to requiring the transmission of the first information corresponding to one frequency domain bandwidth, a frequency domain bandwidth set is determined and a beam failure event occurs currently and has not been recovered successfully for each frequency domain bandwidth in the frequency domain bandwidth set, and the first information corresponding to the frequency domain bandwidth set is transmitted; in response to requiring the transmission of the first information corresponding to one frequency domain bandwidth, a frequency domain bandwidth set is determined and a beam failure event occurs currently and has not been recovered successfully for each frequency domain bandwidth in the frequency domain bandwidth set, M frequency domain bandwidths are selected from the determined frequency domain bandwidth set, one or more beam failure request resource are selected based on the selected M frequency domain bandwidths, and the first information corresponding to the M frequency domain bandwidths is transmitted on the one or more beam failure request resources; in response to requiring the transmission of the first information corresponding to one frequency domain bandwidth, a frequency domain bandwidth set is determined and a beam failure event occurs currently and has not been recovered successfully for each frequency domain bandwidth in the frequency domain bandwidth set, M frequency domain bandwidths are selected from the determined frequency domain bandwidth set, and the first information corresponding to the M frequency domain bandwidths is transmitted: C pieces of response information are monitored, here one piece of response information is the response information of the first information corresponding to one or more frequency domain bandwidth sets and C is a non-negative integer smaller than or equal to N: or in response to receiving the response information corresponding to one frequency domain bandwidth set, it is determined that the beam failure recovery process corresponding to the frequency domain bandwidth set is completed successfully.

Here the first information includes at least one of the index of a CC, the index of an active BWP currently in the CC, the index of a bandwidth part (BWP) in the CC where beam failure occurs for the bandwidth part (BWP), or the indication information of a new reference signal selected from the candidate reference signal set corresponding to the CC. Each of the N frequency domain bandwidths corresponds to one beam failure time.

A beam failure timer includes at least one of a beam failure recovery timer or a beam failure response information monitoring timer.

A frequency domain bandwidth set includes one or more frequency domain bandwidths.

In embodiments of the present disclosure, the first beam failure recovery module uses the following manner to perform the step in which the first information corresponding to the frequency domain bandwidth set is transmitted on one beam failure request resource: transmitting one reference signal in the beam failure request resource, where the reference signal corresponds to the first information corresponding to the frequency domain bandwidth set; or transmitting a information bit representing the first information corresponding to the frequency domain bandwidth set on the beam failure request resource. Here the correspondence relationship between the reference signal of one beam failure request resource and the first information corresponding to the frequency domain bandwidth set may be included in the received signal information.

The first beam failure recovery module is specifically configured to use at least one of the following manners to perform the step in which the first information corresponding to the frequency domain bandwidth set is transmitted on a plurality of beam failure request resources. The first information corresponding to the frequency domain bandwidth set is transmitted on each beam failure request resource of the beam failure request resources; the first information corresponding to one frequency domain bandwidth in the frequency domain bandwidth set is transmitted on each beam failure request resource of the beam failure request resources; or the first information corresponding to part of the frequency domain bandwidths in the frequency domain bandwidth set is transmitted on each beam failure request resource of the beam failure request resources.

The first beam failure recovery module is specifically configured to use the following manner to perform the step in which one or more beam failure request resources are selected based on the determined frequency domain bandwidth set: One or more beam failure request resources are selected from P beam failure request resources based on the determined frequency domain bandwidth set.

The step in which M frequency domain bandwidths are selected from the determined frequency domain bandwidth set includes the step of selecting the M frequency domain bandwidths from the determined frequency bandwidth set based on the second information.

The step in which C pieces of response information are monitored includes one of the following manners: The C pieces of response information are monitored in one beam failure search space; one piece of response information corresponding to a beam failure search space is monitored in the beam failure search space of C beam failure search spaces, where the one piece of response information is among the C pieces of response information; or the C pieces of response information are monitored in more than one frequency domain bandwidth.

The P beam failure request resources include one of P beam failure request resources of beam failure request resources corresponding to the N frequency domain bandwidths: a union of the beam failure request resources corresponding to the N frequency domain bandwidths; beam failure request resources corresponding to the first information corresponding to the M frequency domain bandwidths in the union of the beam failure request resources corresponding to the N frequency domain bandwidths; a union of the beam failure request resources corresponding to the M frequency domain bandwidths; or a beam failure request resource in one frequency domain bandwidth.

In the preceding method three for beam failure recovery, the maximum number of the beam failure recovery processes performed simultaneously is associated with the number of frequency domain bandwidths each of which is configured with a beam failure recovery parameter, and/or the maximum number of the beam failure recovery processes performed simultaneously is smaller than or equal to a predetermined value. For example, the maximum number of the beam failure recovery processes that correspond to time domain resources with a non-empty intersection and are among the beam failure recovery processes performed simultaneously is smaller than or equal to the number of frequency domain bandwidths each of which is configured with a beam failure recovery parameter.

In the preceding method three for beam failure recovery, no constraint may be implemented for the step in which the beam failure recovery processes of the N frequency domain bandwidths are performed simultaneously. For example, the beam failure recovery processes of the N frequency domain bandwidths performed simultaneously are independent of each other and do not affect each other.

Alternatively, some constraints may be implemented for the step in which the beam failure recovery processes of the N frequency domain bandwidths are performed simultaneously. For example, in the beam failure recovery processes of the N frequency domain bandwidths performed simultaneously, the first information corresponding to one frequency domain bandwidth can be transmitted only on one uplink beam failure request resource at one time.

For example, the first beam failure recovery module is specifically configured to use at least one of the manners below to perform the step in which the beam failure recovery processes of the N frequency domain bandwidths are performed simultaneously.

Each frequency domain bandwidth of the N frequency domain bandwidths corresponds to one beam failure timer; Y1 frequency domain bandwidths among the N frequency domain bandwidths are caused to exist and correspond to beam failure timers whose operation periods have a non-empty intersection, where Y1 is an integer greater than or equal to 1 and smaller than or equal to N; one or more beam failure timers in N beam failure timers corresponding to the N frequency domain bandwidths are caused to operate at one time point; each frequency domain bandwidth of the N frequency domain bandwidths corresponds to one first information transmission counter; in response to a beam failure event occurring in a first frequency domain bandwidth and in response to at least the beam failure recovery process of a second frequency domain bandwidth being performed, the beam failure recovery timer corresponding to the first frequency domain bandwidth is started, where the first frequency domain bandwidth and the second frequency domain bandwidth are two different frequency domain bandwidths of the N frequency domain bandwidths; in response to requiring the transmission of the first information corresponding to a third frequency domain bandwidth and in response to at least the beam failure recovery process of a fourth frequency domain bandwidth being performed, the first information corresponding to the third frequency domain bandwidth is transmitted on the beam failure request resource corresponding to the third frequency domain bandwidth, where the third frequency domain bandwidth and the fourth frequency domain bandwidth are two different frequency domain bandwidths of the N frequency domain bandwidths; N pieces of response information is monitored, where one piece of response information among the N pieces of response information is the beam failure response information corresponding to one or more frequency domain bandwidths of the N frequency domain bandwidths; in the same period, in response to a non-empty intersection existing among time domain resources occupied by beam failure request resources corresponding to N pieces of first information of the N frequency domain bandwidths, M pieces of first information among the N pieces of first information are transmitted in one channel, or M pieces of first information among the N pieces of first information are transmitted in M channels, in the same period, in response to a non-empty intersection existing among the time domain resources occupied by the N beam failure request resources corresponding to the N pieces of first information, the first information is transmitted on each corresponding beam failure request resource; the N pieces of first information is transmitted in response to an empty intersection existing among the N beam failure request resources corresponding to the N pieces of first information in the same period; the signaling information including correspondence relationships among frequency domain bandwidths, beam failure request resources, and first information is received, where the time domain resources occupied by the beam failure request resources of the N frequency domain bandwidths in the signaling information have an empty intersection; or in response to receiving the response information corresponding to a fifth frequency domain bandwidth before the time-out of the beam failure response information monitoring timer corresponding to the fifth frequency domain bandwidth, it is determined that the beam failure recovery process corresponding to the fifth frequency domain bandwidth is completed successfully, and the beam failure timer corresponding to the fifth frequency domain bandwidth is stopped, where the fifth frequency domain bandwidth is any one frequency domain bandwidth of the N frequency domain bandwidths.

Here the first information includes at least one of the index of a CC, the index of an active BWP currently in the CC, the index of a bandwidth part (BWP) in the CC where beam failure occurs for the bandwidth part (BWP), or the indication information of a new reference signal selected from the candidate reference signal set corresponding to the CC.

A beam failure timer includes at least one of a beam failure recovery timer or a beam failure response information monitoring timer. Here M is a positive integer greater than or equal to 1 and smaller than or equal to N.

In embodiments of the present disclosure, the first beam failure recovery module is specifically configured to use the following manner to perform the step in which the beam failure recovery process of one frequency domain bandwidth is being performed: The beam failure timer of one frequency domain bandwidth is being performed.

In embodiments of the present disclosure, in the condition where the first beam failure recovery module is used for transmitting M pieces of first information among the N pieces of first information in one channel or transmitting M pieces of first information among the N pieces of first information in M channels, the one channel or the M channels satisfy one of the characteristics below.

The one channel corresponds to one beam failure request resource in the N beam failure request resources in the same period: the one channel corresponds to one beam failure request resource not included in the N beam failure request resources in the same period: a reference signal of the one channel corresponds to the M pieces of first information, or the one channel includes information bits representing the M pieces of first information: time domain resources occupied by the M channels are a subset of a union of the time domain resources occupied by the N beam failure request resources in the same period; or a time domain resource occupied by each channel of the M channels is a subset of the union of the time domain resources occupied by the N beam failure request resources in the same period, and time domain resources occupied by different channels have an empty intersection.

In embodiments of the present disclosure, the M pieces of first information are selected based on the second information.

In embodiments of the present disclosure, the first beam failure recovery module is specifically configured to use one of the following manners to perform the step in which N pieces of response information is monitored; One piece of response information among the N pieces of response information is monitored in each beam failure search space of N beam failure search spaces; the N pieces of response information is monitored in one beam failure search space; or the N pieces of response information is monitored in one or more frequency domain bandwidths.

In embodiments of the present disclosure, a frequency domain bandwidth corresponding to the transmitted first information satisfies at least one of the characteristics below.

In the period from a first predetermined moment after the first information corresponding to the frequency domain bandwidth is transmitted to the occurrence of a predetermined event, a predetermined demodulation reference signal and a reference signal included in the first information corresponding to the frequency domain bandwidth satisfy the quasi co-location (QCL) relationship; from a second predetermined moment after the response information of the frequency domain bandwidth is received successfully to a moment before the activation or reconfiguration information of the spatial relationship indication information of an uplink control channel in the frequency domain bandwidth is received, a spatial transmission filter of an uplink channel in the frequency domain bandwidth and/or a spatial transmission filter of an uplink signal in the frequency domain bandwidth is acquired based on a spatial transmission filter transmitting the first information corresponding to the frequency domain bandwidth; or from a third predetermined moment after the response information of the frequency domain bandwidth is received successfully, a demodulation reference signal in a control channel resource set CORESET 0 and a reference signal included in the transmitted first information corresponding to the frequency domain bandwidth including the CORESET 0 satisfy the QCL relationship.

Here the predetermined demodulation reference signal includes at least one of: a demodulation reference signal of a control channel in the beam failure recovery search space of the frequency domain bandwidth, a demodulation reference signal of a data channel scheduled by the control channel in the beam failure recovery search space of the frequency domain bandwidth, a demodulation reference signal of a data channel that is in the frequency domain bandwidth and is scheduled by the control channel in the beam failure recovery search space of the frequency domain bandwidth, a demodulation reference signal of the control channel in a beam failure recovery search space in the frequency domain bandwidth, a demodulation reference signal of a data channel scheduled by a control channel in a beam failure recovery search space in the frequency domain bandwidth, or a demodulation reference signal of a data channel that is in the frequency domain bandwidth and is scheduled by a control channel in a beam failure recovery search space in the frequency domain bandwidth.

Here the predetermined event includes one of the events below.

After at least one piece of response information is detected in the beam failure recovery search space of the frequency domain bandwidth, the reconfiguration or activation information of a quasi co-location reference signal of the downlink control channel of the frequency domain bandwidth is received; after at least one piece of response information is detected in the beam failure recovery search space of the frequency domain bandwidth, the reconfiguration or activation information of a quasi co-location reference signal of a downlink control channel in a frequency domain bandwidth corresponding to a beam failure detection reference signal set, the reconfiguration or activation information of a quasi co-location reference signal of the downlink control channel of the frequency domain bandwidth is received; the reconfiguration or activation information of a quasi co-location reference signal of a downlink control channel is received; or the detection of a control channel in the beam failure search space of the frequency domain bandwidth is stopped.

Here at least one of the first predetermined moment, the second predetermined moment, or the third predetermined moment is acquired based on at least one of the subcarrier spacing of a BWP where the beam failure request resource for transmitting the first information corresponding to the frequency domain bandwidth is located, the subcarrier spacing of an active BWP in the frequency domain bandwidth, or the ratio of the subcarrier spacing of the active BWP in the frequency domain bandwidth to the subcarrier spacing of the BWP where the beam failure request resource for transmitting the first information corresponding to the frequency domain bandwidth is located.

In embodiments of the present disclosure, beam failure request resources corresponding to the N frequency domain bandwidths belong to the same frequency domain bandwidth or different frequency domain bandwidths respectively: and/or, beam failure search spaces corresponding to the N frequency domain bandwidths belong to the same frequency domain bandwidth or different frequency domain bandwidths respectively.

In embodiments of the present disclosure, one frequency domain bandwidth includes at least one of one carrier component (CC), one BWP, or one physical resource block set; and/or, the first information corresponding to one CC includes the first information corresponding to one BWP in the CC. Here one BWP includes at least one of an active BWP currently in one CC, a BWP corresponding to the reference signal corresponding to the reference signal indication information included in the first information corresponding to the CC, or a BWP corresponding to the BWP indication information included in the first information corresponding to the CC.

In embodiments of the present disclosure, one frequency domain bandwidth includes at least one of one carrier component (CC) or one BWP.

In embodiments of the present disclosure, the case where the non-empty intersection exists among the time domain resources corresponding to the beam failure recovery processes of the N frequency domain bandwidths includes at least one of the cases below.

In response to requiring the transmission of the first information corresponding to one frequency domain bandwidth, at least the beam failure recovery process of another frequency domain bandwidth is being performed; in response to requiring the transmission of the first information corresponding to one frequency domain bandwidth, at least the beam failure response information of another frequency domain bandwidth is being monitored: or in the intersection among the time domain resources corresponding to the beam failure recovery processes of the N frequency domain bandwidths, a beam failure event occurs and has not been recovered successfully for each frequency domain bandwidth in the N frequency domain bandwidths.

Here the time domain resource corresponding to a beam failure recovery process includes at least one of a period from detecting a beam failure event to hearing beam failure response information, a period from detecting a beam failure event to stopping monitoring a period of a control channel in a beam failure search space, a period from transmitting the first information corresponding to a frequency domain bandwidth to hearing beam failure response information, a period from transmitting the first information to stopping monitoring a control channel in a beam failure search space, an operation period of a beam failure recovery timer, or an operation period of a beam failure response information monitoring timer.

In another embodiment of the present disclosure, a beam failure detection module is included.

The beam failure detection module is configured to determine whether a beam failure event occurs for each frequency domain bandwidth by detecting a beam failure detection reference signal in a beam failure detection reference signal set corresponding to each frequency domain bandwidth, where different frequency domain bandwidths correspond to different beam failure detection reference signal sets.

Embodiments of the present disclosure enable beam failure recovery processes of N CCs to be performed when a collision occurs among time domain resources corresponding to the beam failure recovery processes of the N CCs, thus recovering the communication links of a plurality of frequency domain bandwidths rapidly.

The implementation process of the preceding apparatus for beam failure recovery is the same as the implementation process of the preceding method for beam failure recovery and is not repeated here.

Another embodiment of the present disclosure provides an apparatus for beam failure recovery. The apparatus includes a processor and a computer-readable storage medium. The computer-readable storage medium stores an instruction which, when executed by the processor, causes the processor to perform any one of the preceding methods for beam failure recovery.

Another embodiment of the present disclosure provides a computer-readable storage medium. The computer-readable storage medium stores a computer program which, when executed by a processor, causes the processor to perform steps of any one of the preceding methods for beam failure recovery.

Another embodiment of the present disclosure provides an apparatus for determining a beam failure recovery parameter. The apparatus includes an information determination module.

The information determination module is configured to determine at least one of the following information based on at least one of the signaling information or a predetermined rule: the correspondence relationship between one beam failure request resource and the first information of E frequency domain bandwidths, a condition to be satisfied by beam failure request resources of G frequency domain bandwidths, the correspondence relationship between one piece of first information and H types of resources, a transmission occasion of the first information corresponding to a first frequency domain bandwidth in a second frequency domain bandwidth, or beam failure recovery parameter information in response to one frequency domain bandwidth including beam failure recovery resources of F frequency domain bandwidths, where E, F, G, and H are each an integer greater than 1.

In another embodiment of the present disclosure, a second beam failure recovery module is included.

The second beam failure recovery module is configured to perform a beam failure recovery process based on the determined information. The manner of performing a beam failure recovery process based on the determined information may refer to implementation processes of other embodiments. For example, at least one of the following processes of a Pcell and/or a Scell is performed based on the determined information: Beam failure is detected; a new beam is selected; beam failure request information is transmitted; beam failure response information is monitored; a QCL parameter is determined, a spatial transmission filter is determined, and so on. This is not repeated here.

In embodiments of the present disclosure, for example, the signal information includes the correspondence relationship between one beam failure request resource and the first information of E frequency domain bandwidths. For example, in the preceding step in which the beam failure recovery processes of the N frequency domain bandwidths are performed simultaneously, M pieces of first information are transmitted in one channel; alternatively, in the case where M pieces of first information among the N pieces of first information are transmitted in M channels; the first information of the E frequency domain bandwidths is the preceding M pieces of first information.

In embodiments of the present disclosure, a reference signal includes at least one of a preamble, a demodulation reference signal, or a sounding reference signal.

In embodiments of the present disclosure, one resource includes one of one preamble, one PUCCH resource, one PUSCH resource, or one SR resource.

In embodiments of the present disclosure, the information determination module is specifically configured to use at least one of the manners below to perform the step of determining a condition to be satisfied by beam failure request resources of G frequency domain bandwidths.

An empty intersection is caused to exist among time domain resources occupied by the beam failure request resources of the G frequency domain bandwidths in the same period; alternatively, a random access transmission occasion does not include beam failure request resources of more than one frequency domain bandwidth.

Here one transmission occasion may be one PRACH occasion or a resource of a periodic uplink channel resource in one period.

In embodiments of the present disclosure, the information determination module is specifically configured to use at least one of the manners below to perform the step of determining the correspondence relationship between one piece of first information and H types of resources.

The signaling information includes the correspondence relationship between the one piece of first information and the H types of resources. A first-type resource and a second-type resource that are included in the H types of resources satisfy at least one of the following characteristics: The first-type resource is associated with one piece of spatial relationship indication information, or the second-type resource is associated with no spatial relationship indication information; a first-type resource includes at least one of a physical uplink control channel (PUCCH) resource, a PRACH resource, or a scheduling request (SR) resource; and a second-type resource includes a PRACH resource. The H types of resources are located in different frequency domain bandwidths. The H types of resources include resources located in different bandwidth parts (BWP) of one component carrier (CC). The H types of resources include different resources of a CC where the H types of resources are located.

Here one piece of first information is the first information corresponding to one frequency domain bandwidth or the first information corresponding to one frequency domain bandwidth set. For example, the first information corresponding to a frequency domain bandwidth set {CC1, CC2} includes {the first information corresponding to the CC1, the first information corresponding to the CC2}.

In embodiments of the present disclosure, the second beam failure recovery module is further configured to perform at least one of the steps below.

The one piece of first information is transmitted in one or more types of resources among the H types of resources, where a BWP where the one or more types of resources are located is in the active state currently; the one piece of first information is transmitted in one or more types of resources among the H types of resources, where no beam failure event occurs for a frequency domain bandwidth where the one or more types of resources are located; the one piece of first information is transmitted in one or more types of the resources among the H types of resources in response to a beam failure event occurring in each of the frequency domain bandwidths where the H-type resources are located: the first information is transmitted in the first-type resource in response to no beam failure event occurring in a frequency domain bandwidth where the first-type resource associated with the one piece of first information is located; or the first information is transmitted in the second-type resource in response to a beam failure event occurring in a frequency domain bandwidth where the first-type resource associated with the one piece of first information is located.

In embodiments of the present disclosure, the information determination module is specifically configured to use one of the manners below to implement the determination of a transmission occasion of the first information corresponding to a first frequency domain bandwidth in a second frequency domain bandwidth.

The signaling information includes the correspondence relationship between the first information corresponding to the first frequency domain bandwidth and the index of the transmission occasion in the second frequency domain bandwidth; the signaling information includes the correspondence relationship between the first information corresponding to the first frequency domain bandwidth and the index of a synchronous signal block (SSB) corresponding to the second frequency domain bandwidth: the transmission occasion is determined based on the index of an SSB corresponding to a reference signal in the beam failure detection reference signal set corresponding to the second frequency domain bandwidth, where the link performance of the reference signal is higher than a predetermined threshold; the transmission occasion is determined based on the index of an SSB corresponding to a reference signal in the candidate reference signal set corresponding to the second frequency domain bandwidth, where the link performance of the reference signal is higher than a predetermined threshold; the transmission occasion is determined based on the index of an SSB corresponding to a reference signal in the candidate reference signal set corresponding to the first frequency domain bandwidth, where the link performance of the reference signal is higher than a predetermined threshold; or the transmission occasion is determined based on an SSB corresponding to a reference signal included in the first information of the first frequency domain.

Here an SSB corresponding to one reference signal includes an SSB satisfying the quasi co-location relationship with the reference signal.

In embodiments of the present disclosure, the information determination module is specifically configured to use the following manner to implement the manner where the signaling information includes the correspondence relationship between the first information corresponding to the first frequency domain bandwidth and the index of the transmission occasion in the second frequency domain bandwidth: The signaling information includes the first information, one or more pieces of transmission occasion index information, and the reference signal sequence information in beam failure request resources; alternatively, the information determination module is specifically configured to use the following manner to implement the manner where the signaling information includes the correspondence relationship between the first information corresponding to the first frequency domain bandwidth and the index of an SSB: The signaling information includes the first information, indices of one or more SSBs, and the reference signal sequence information in beam failure request resources.

In embodiments of the present disclosure, the information determination module is specifically configured to use at least one of the manners below to perform the step of determining the beam failure recovery parameter information in response to one frequency domain bandwidth including beam failure recovery resources of F frequency domain bandwidths.

The F frequency domain bandwidths correspond to F sets of first-type beam failure recovery parameter information and F sets of second-type beam failure recovery parameter information; the F frequency domain bandwidths correspond to one set of first-type beam failure recovery parameter information and F sets of second-type beam failure recovery parameter information; the F frequency domain bandwidths correspond to one set of first-type beam failure recovery parameter information and one set of second-type beam failure recovery parameter information; or the correspondence relationship between the F frequency domain bandwidths and F sets of first-type beam failure recovery parameters and/or F sets of second-type beam failure recovery parameters is determined based the signaling information and/or the predetermined rule. Here one beam failure recovery resource includes at least one of a beam failure request resource or a beam failure search space resource.

In embodiments of the present disclosure, the first-type beam failure recovery parameter information includes at least one of the following configuration information: the format information of a preamble included in a PRACH (this parameter may be prach-Configuration Index), the frequency domain resource information of the PRACH (this parameter may be msg1-FDM and/or msg1-FrequencyStart), the target received power information of the PRACH, the maximum transmitted power information of the preamble, power ramping step information, the maximum duration information of a beam failure response information monitoring timer, the cyclic shift information of the preamble, the maximum duration corresponding to a beam failure detection timer, or the maximum number of times corresponding to a beam failure detection counter.

In embodiments of the present disclosure, the second-type beam failure recovery parameter information includes at least one of the following configuration information: the starting logical root index information of a preamble, the performance threshold information of a beam failure detection reference signal, the information of the correspondence relationship between a candidate reference signal and the preamble, the information of the mapping relationship between an SSB and a PRACH transmission occasion (for example, this parameter is the ssb-perRACH-Occasion information), the PRACH transmission occasion index information in a PRACH transmission occasion set corresponding to one SSB (for example, this parameter is ra-ssb-OccasionMask Index), a beam failure search space, a beam failure recovery timer, or a candidate reference signal set.

In embodiments of the present disclosure, the first information includes at least one of the index of a CC, the index of an active BWP currently in the CC, the index of a BWP in the CC where beam failure occurs for the BWP, the indication information of a new reference signal selected from the candidate reference signal set corresponding to the CC, beam failure request information, or the information transmitted in response to detecting a beam failure event through detecting one reference signal set.

In embodiments of the present disclosure, a frequency domain bandwidth includes at least one of a BWP, a CC, or a physical resource block set.

The implementation process of the preceding apparatus for determining a beam failure recovery parameter is the same as the implementation process of the preceding method for determining a beam failure recovery parameter and is not repeated here.

Figure 11:
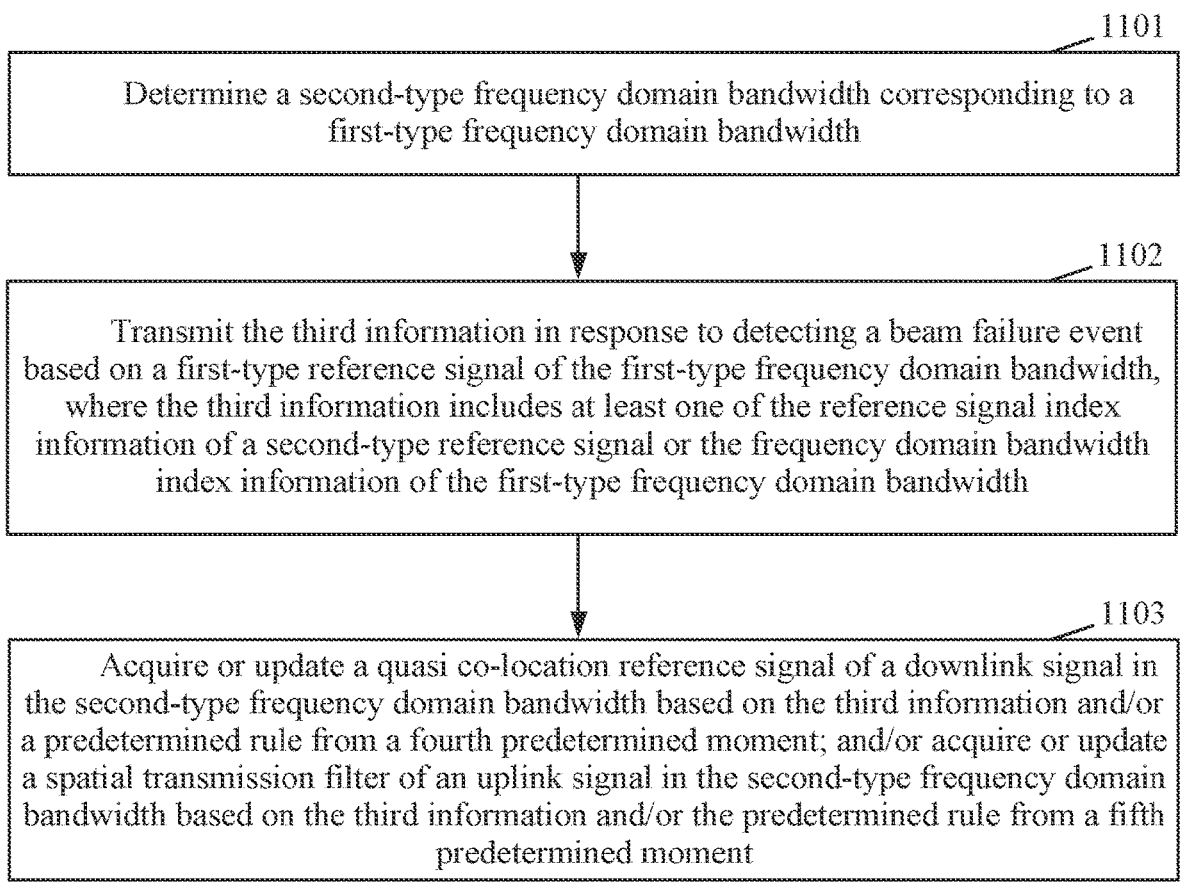
FIG. 11 is a flowchart of a method for determining a quasi co-location reference signal according to another embodiment of the present disclosure.

Referring to FIG. 11, another embodiment of the present disclosure provides a method for determining a quasi co-location reference signal. The method includes the steps below.

In step 1101, a second-type frequency domain bandwidth corresponding to a first-type frequency domain bandwidth is determined.

In embodiments of the present disclosure, a second-type frequency domain bandwidth corresponding to a first-type frequency domain bandwidth may be any frequency domain bandwidth. For example, a second-type frequency domain bandwidth may be a frequency domain bandwidth whose beam correlation with a first-type frequency domain bandwidth is greater than or equal to a preset threshold.

In embodiments of the present disclosure, a beam failure detection reference signal is configured for a first-type frequency domain bandwidth, while no beam failure detection reference signal is configured for a second-type frequency domain bandwidth.

In embodiments of the present disclosure, a second-type frequency domain bandwidth corresponding to a first-type frequency domain bandwidth is determined based on at least one of the following information: the received signaling information including the second-type frequency domain bandwidth corresponding to the first-type frequency domain bandwidth: the transmitted signaling information including the second-type frequency domain bandwidth corresponding to the first-type frequency domain bandwidth; the index of a frequency domain bandwidth where a first-type reference signal is located, where at least one first-type reference signal is in the second-type frequency domain bandwidth; the index of a frequency domain bandwidth where a second-type reference signal is located, where at least one second-type reference signal is in the second-type frequency domain bandwidth; a bandwidth where the first-type frequency domain bandwidth is located, where the second-type frequency domain bandwidth is located in the bandwidth locating the first-type frequency domain bandwidth; the information that one second-type frequency domain bandwidth corresponds to one or more first-type frequency domain bandwidths; the information that one first-type frequency domain bandwidth corresponds to one or more second-type frequency domain bandwidths: or the information that the first frequency domain bandwidth and the second frequency domain bandwidth are different frequency domain bandwidths or the same frequency domain bandwidth.

A frequency domain bandwidth includes at least one of a BWP, a CC, or a physical resource block set.

In step 1102, the third information is transmitted in response to detecting a beam failure event based on a first-type reference signal of the first-type frequency domain bandwidth. Here the third information includes at least one of the reference signal index information of a second-type reference signal or the frequency domain bandwidth index information of the first-type frequency domain bandwidth.

In embodiments of the present disclosure, a second-type reference signal refers to a reference signal in a candidate reference signal set.

In embodiments of the present disclosure, at least one of the characteristics below are satisfied.

A first-type reference signal and a demodulation reference signal of a control channel in the first-type frequency domain bandwidth satisfy the quasi co-location relationship;

a first-type reference signal includes a reference signal in the beam failure detection reference signal set of the first-type frequency domain bandwidth; a first-type reference signal is in the first-type frequency domain bandwidth; a second-type reference signal is in the first-type frequency domain bandwidth; after the third information is transmitted, the response information corresponding to the third information is monitored in the downlink control channel in the first-type frequency domain bandwidth and the downlink control channel in the second-type frequency domain bandwidth; or after the third information is transmitted, the response information corresponding to the third information is heard in at least one downlink control channel of the downlink control channel in the first-type frequency domain bandwidth or the downlink control channel in the second-type frequency domain bandwidth, the transmission of the third information is stopped, and the beam failure timer corresponding to the third information is stopped.

Here a beam failure timer includes at least one of a beam failure recovery timer or a beam failure response information monitoring timer.

In step 1103, a quasi co-location reference signal of a downlink signal in the second-type frequency domain bandwidth is acquired or updated based on the third information and/or a predetermined rule from a fourth predetermined moment; and/or a spatial transmission filter of an uplink signal in the second-type frequency domain bandwidth is acquired or updated based on the third information and/or the predetermined rule from a fifth predetermined moment.

In embodiments of the present disclosure, the step in which a quasi co-location reference signal of a downlink signal in the second-type frequency domain bandwidth is acquired or updated based on the third information and/or a predetermined rule includes at least one of the manners below.

A quasi co-location reference signal of the downlink signal in the second-type frequency domain bandwidth is updated to serve as a second-type reference signal corresponding to the reference signal index information or serve as a third-type reference signal, where the quasi co-location reference signal is related to a first-type quasi co-location parameter.

A quasi co-location reference signal of the downlink signal in the second-type frequency domain bandwidth is updated to serve as a third-type reference signal or serve as a second-type reference signal corresponding to the reference signal index information of first-type index information, where the quasi co-location reference signal is related to a second-type quasi co-location parameter.

Here a first-type quasi co-location parameter includes at least one of the following quasi co-location parameters: a spatial Rx parameter, a Doppler shift, or an average delay.

Here a second-type quasi co-location parameter includes at least one of the following quasi co-location parameters: a Doppler spread or a delay spread.

Here a third-type reference signal satisfies at least one of the following characteristics: The third-type reference signal is located in the second-type frequency domain bandwidth; the third-type reference signal corresponds to a second-type reference signal, the third-type reference signal corresponds to a first-type frequency domain bandwidth index; or the third-type reference signal belongs to a predetermined reference signal set.

Here a downlink signal includes at least one of a demodulation reference signal of a downlink control channel in a predetermined control channel resource in the second-type frequency domain bandwidth, a demodulation reference signal scheduled by the downlink control channel in the predetermined control channel resource in the second-type frequency domain bandwidth, or a demodulation reference signal that is located in a data channel in the second-type frequency domain bandwidth and is scheduled by the downlink control channel in the predetermined control channel resource in the second-type frequency domain bandwidth. Here the predetermined control channel resource includes one of: a control channel resource where the beam failure recovery search space of the second-type frequency domain bandwidth is located, a downlink control channel resource which is located in the second-type frequency domain bandwidth and whose the demodulation reference signal satisfies a quasi-co-location with a first-type reference signal, or at least one downlink control channel resource predetermined in the second-type frequency domain bandwidth.

In embodiments of the present disclosure, the fourth predetermined moment and/or the fifth predetermined moment includes at least one of a moment after an A time domain symbol after the third information is transmitted, a moment after a B time domain symbol after the successful transmission of the third information is determined, a moment after a C time domain symbol after the successful completion of a beam failure recovery process for the first-type frequency domain bandwidth is determined, or a moment after a D time domain symbol after control information is detected in the predetermined control channel resource. Here A, B, C, and D each satisfies at least one of the following characteristics: being an integer greater than or equal to 1, being a fixed value, or being acquired by the reported capability information.

Here the fourth predetermined moment and the fifth predetermined moment are the same moment or different moments.

In embodiments of the present disclosure, at least one of A, B, C, or D is acquired based on at least one of a subcarrier spacing parameter $2^{\mu_1}$ corresponding to the first-type frequency domain bandwidth, a subcarrier spacing parameter $2^{\mu_2}$ corresponding to the second-type frequency domain bandwidth, or a ratio $2^{\mu_2-\mu_1}$ of the subcarrier spacing parameter corresponding to the second-type frequency domain bandwidth to the subcarrier spacing parameter corresponding to first-type frequency domain bandwidth. Here a subcarrier spacing parameter $2^{\mu_1}$ corresponding to the $i^{th}$-type frequency bandwidth includes a subcarrier spacing $2^{\mu_1} f_0$ of an active bandwidth part (BWP) of the $i^{th}$-type frequency bandwidth. Here $f_0$ is a fixed value, and i is 1 or 2. The $i^{th}$-type frequency bandwidth comprises the first-type frequency domain bandwidth and the second-type frequency domain bandwidth.

In embodiments of the present disclosure, the step in which a spatial transmission filter of an uplink signal in the second-type frequency domain bandwidth is acquired or updated based on the third information and/or the predetermined rule includes the manners below.

The spatial transmission filter of the uplink signal in the second-type frequency domain bandwidth is acquired based on a spatial receiving filter for receiving a second-type reference signal; alternatively, the spatial transmission filter of the uplink signal in the second-type frequency domain bandwidth is acquired based on a fourth-type reference signal that corresponds to a second-type reference signal and is in the second-type frequency domain bandwidth.

In embodiments of the present disclosure, an uplink signal includes an uplink control channel signal.

Figure 12:
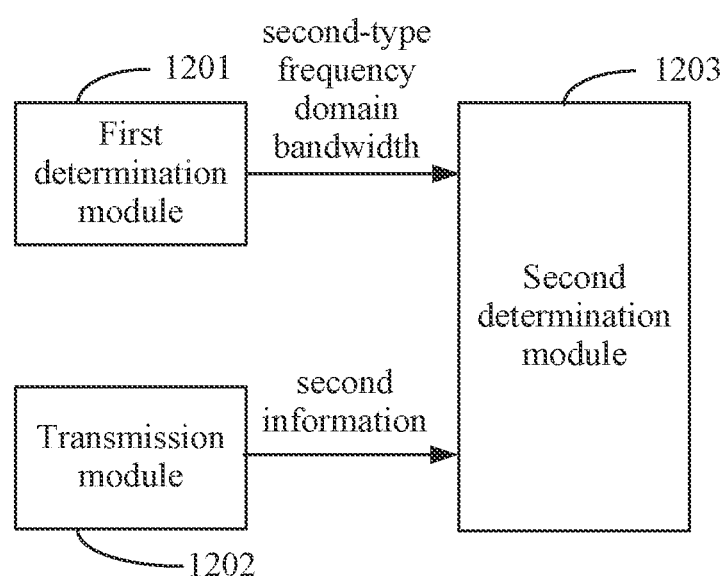
FIG. 12 is a diagram illustrating the structure of an apparatus for determining a quasi co-location reference signal according to another embodiment of the present disclosure.

Referring to FIG. 12, another embodiment of the present disclosure provides an apparatus for determining a quasi co-location reference signal. The apparatus includes a first determination module 1201, a transmission module 1202, and a second determination module 1203.

The first determination module 1201 is configured to determine a second-type frequency domain bandwidth corresponding to a first-type frequency domain bandwidth. The transmission module 1202 is configured to transmit the third information in response to detecting a beam failure event based on a first-type reference signal of the first-type frequency domain bandwidth. Here the third information includes at least one of the reference signal index information of a second-type reference signal or the frequency domain bandwidth index information of the first-type frequency domain bandwidth. The second determination module 1203 is configured to acquire or update a quasi co-location reference signal of a downlink signal in the second-type frequency domain bandwidth based on the third information and/or a predetermined rule from a fourth predetermined moment and/or acquire or update a spatial transmission filter of an uplink signal in the second-type frequency domain bandwidth based on the third information and/or the predetermined rule from a fifth predetermined moment.

In embodiments of the present disclosure, a second-type frequency domain bandwidth corresponding to a first-type frequency domain bandwidth may be any frequency domain bandwidth. For example, a second-type frequency domain bandwidth may be a frequency domain bandwidth whose beam correlation with a first-type frequency domain bandwidth is greater than or equal to a preset threshold.

In embodiments of the present disclosure, a beam failure detection reference signal is configured for a first-type frequency domain bandwidth, while no beam failure detection reference signal is configured for a second-type frequency domain bandwidth.

In embodiments of the present disclosure, the first determination module 1201 is specifically configured to determine a second-type frequency domain bandwidth corresponding to a first-type frequency domain bandwidth based on at least one of the following information: the received signaling information including the second-type frequency domain bandwidth corresponding to the first-type frequency domain bandwidth; the transmitted signaling information including the second-type frequency domain bandwidth corresponding to the first-type frequency domain bandwidth; the index of a frequency domain bandwidth where a first-type reference signal is located, where at least one first-type reference signal is in the second-type frequency domain bandwidth; the index of a frequency domain bandwidth where a second-type reference signal is located, where at least one second-type reference signal is in the second-type frequency domain bandwidth; a bandwidth where the first-type frequency domain bandwidth is located, where the second-type frequency domain bandwidth is located in the bandwidth locating the first-type frequency domain bandwidth; the information that one second-type frequency domain bandwidth corresponds to one or more first-type frequency domain bandwidths; the information that one first-type frequency domain bandwidth corresponds to one or more second-type frequency domain bandwidths; or the information that the first frequency domain bandwidth and the second frequency domain bandwidth are different frequency domain bandwidths or the same frequency domain bandwidth.

A frequency domain bandwidth includes at least one of a BWP, a CC, or a physical resource block set.

In embodiments of the present disclosure, at least one of the characteristics below are satisfied.

A first-type reference signal and a demodulation reference signal of a control channel in the first-type frequency domain bandwidth satisfy the quasi co-location relationship; a first-type reference signal includes a reference signal in the beam failure detection reference signal set of the first-type frequency domain bandwidth; a first-type reference signal is in the first-type frequency domain bandwidth; a second-type reference signal is in the first-type frequency domain bandwidth; after the third information is transmitted, the response information corresponding to the third information is monitored in the downlink control channel in the first-type frequency domain bandwidth and the downlink control channel in the second-type frequency domain bandwidth; or after the third information is transmitted, the response information corresponding to the third information is heard in at least one downlink control channel of the downlink control channel in the first-type frequency domain bandwidth or the downlink control channel in the second-type frequency domain bandwidth, the transmission of the third information is stopped, and the beam failure timer corresponding to the third information is stopped.

Here a beam failure timer includes at least one of a beam failure recovery timer or a beam failure response information monitoring timer.

In embodiments of the present disclosure, the second determination module 1203 is specifically configured to use at least one of the manners below to perform the step in which a quasi co-location reference signal of a downlink signal in the second-type frequency domain bandwidth is acquired or updated based on the third information and/or a predetermined rule.

A quasi co-location reference signal of the downlink signal in the second-type frequency domain bandwidth is updated to serve as a second-type reference signal corresponding to the reference signal index information or serve as a third-type reference signal, where the quasi co-location reference signal is related to a first-type quasi co-location parameter.

A quasi co-location reference signal of the downlink signal in the second-type frequency domain bandwidth is updated to serve as a third-type reference signal or serve as a second-type reference signal corresponding to the reference signal index information of first-type index information, where the quasi co-location reference signal is related to a second-type quasi co-location parameter.

Here a first-type quasi co-location parameter includes at least one of the following quasi co-location parameters: a spatial Rx parameter, a Doppler shift, or an average delay.

Here a second-type quasi co-location parameter includes at least one of the following quasi co-location parameters: a Doppler spread or a delay spread.

Here a third-type reference signal satisfies at least one of the following characteristics: The third-type reference signal is located in the second-type frequency domain bandwidth; the third-type reference signal corresponds to a second-type reference signal; the third-type reference signal corresponds to a first-type frequency domain bandwidth index; or the third-type reference signal belongs to a predetermined reference signal set.

Here a downlink signal includes at least one of a demodulation reference signal of a downlink control channel in a predetermined control channel resource in the second-type frequency domain bandwidth, a demodulation reference signal scheduled by the downlink control channel in the predetermined control channel resource in the second-type frequency domain bandwidth, or a demodulation reference signal that is located in a data channel in the second-type frequency domain bandwidth and is scheduled by the downlink control channel in the predetermined control channel resource in the second-type frequency domain bandwidth. Here the predetermined control channel resource includes one of: a control channel resource where the beam failure recovery search space of the second-type frequency domain bandwidth is located, a downlink control channel resource which is located in second-type frequency domain bandwidth and whose the demodulation reference signal satisfies the quasi co-location relationship with a first-type reference signal, or at least one downlink control channel resource predetermined in the second-type frequency domain bandwidth.

In embodiments of the present disclosure, the fourth predetermined moment and/or the fifth predetermined moment includes at least one of a moment after an A time domain symbol after the third information is transmitted, a moment after a B time domain symbol after the successful transmission of the third information is determined, a moment after a C time domain symbol after the successful completion of a beam failure recovery process for the first-type frequency domain bandwidth is determined, or a moment after a D time domain symbol after control information is detected in the predetermined control channel resource.

Here A, B, C, and D each satisfies at least one of the following characteristics: being an integer greater than or equal to 1, being a fixed value, or being acquired by the reported capability information.

Here the fourth predetermined moment and the fifth predetermined moment are the same moment or different moments.

In embodiments of the present disclosure, at least one of A, B, C, or D is acquired based on at least one of a subcarrier spacing parameter $2^{\mu_1}$ corresponding to the first-type frequency domain bandwidth, a subcarrier spacing parameter $2^{\mu_2}$ corresponding to the second-type frequency domain bandwidth, or a ratio $2^{\mu_2-\mu_1}$ of the subcarrier spacing parameter corresponding to the second-type frequency domain bandwidth to the subcarrier spacing parameter corresponding to first-type frequency domain bandwidth. Here a subcarrier spacing parameter $2^{\mu_1}$ corresponding to the $i^{th}$-type frequency bandwidth includes a subcarrier spacing $2^{\mu_1} f_0$ of an active bandwidth part (BWP) of the $i^{th}$-type frequency bandwidth. Here $f_0$ is a fixed value, and i is 1 or 2. The $i^{th}$-type frequency bandwidth comprises the first-type frequency domain bandwidth and the second-type frequency domain bandwidth.

In embodiments of the present disclosure, the second determination module 1203 is specifically configured to use one of the manners below to perform the step in which a spatial transmission filter of an uplink signal in the second-type frequency domain bandwidth is acquired or updated based on the third information and/or the predetermined rule.

The spatial transmission filter of the uplink signal in the second-type frequency domain bandwidth is acquired based on a spatial receiving filter for receiving a second-type reference signal: alternatively, the spatial transmission filter of the uplink signal in the second-type frequency domain bandwidth is acquired based on a fourth-type reference signal that corresponds to a second-type reference signal and is in the second-type frequency domain bandwidth.

In embodiments of the present disclosure, an uplink signal includes an uplink control channel signal.

The implementation process of the preceding apparatus for determining a quasi co-location reference signal is the same as the implementation process of the preceding method for determining a quasi co-location reference signal and is not repeated here.

Another embodiment of the present disclosure provides an apparatus for determining a quasi co-location reference signal. The apparatus includes a processor and a computer-readable storage medium. The computer-readable storage medium stores an instruction which, when executed by the processor, causes the processor to perform any one of the preceding methods for determining a quasi co-location reference signal.

Another embodiment of the present disclosure provides a computer-readable storage medium. The computer-readable storage medium stores a computer program which, when executed by a processor, causes the processor to perform steps of any one of the preceding methods for determining a quasi co-location reference signal.

Embodiment Ten

In this embodiment, the steps below are performed.

In step one, one or more second-type frequency domain bandwidths corresponding to a first-type frequency domain bandwidth are determined.

In step two, the third information (also referred to as beam failure request information) corresponding to the first-type frequency domain bandwidth is transmitted in response to detecting a beam failure event based on a beam failure detection reference signal (that is, a first-type reference signal) of the first-type frequency domain bandwidth. Here the third information includes at least one of the index of the CC where the first-type frequency domain bandwidth is located (that is, the index information of the frequency domain bandwidth), the index of the BB where the first-type frequency domain bandwidth is located (that is, the index information of the frequency domain bandwidth), or the indication information of a new reference signal selected from the candidate reference signal set corresponding to the first-type frequency domain bandwidth (that is, the reference signal index information).

In step three, a quasi co-location reference signal of a downlink signal in a second-type frequency domain bandwidth is acquired or updated based on the third information and/or a predetermined rule from a fourth predetermined moment, and/or a spatial transmission filter of an uplink signal in a second-type frequency domain bandwidth is acquired or updated based on the third information and/or the predetermined rule from a fifth predetermined moment.

A serving cell group includes {CC1, CC2}. The CC1 is configured with a beam failure detection reference signal set (that is, first-type reference signals), alternatively, the CC1 is configured with a related beam failure recovery parameter. A beam failure detection reference signal in the CC1 is acquired based on a quasi co-location reference signal of a control channel resource in the CC1. The CC2 is not configured with a beam failure detection reference signal set and a terminal does not use a quasi co-location reference signal of a control channel resource in the CC2 as a beam failure detection reference signal of the CC2. In summary, a reference signal in a beam failure detection reference signal set satisfies the quasi co-location relationship with a demodulation reference signal of a CORESET in the CC1 and may not satisfy the quasi co-location relationship with a demodulation reference signal of a CORESET in the CC2.

The terminal acquires whether a beam failure event occurs by detecting a first-type reference signal. When determining that a beam failure event occurs, the terminal transmits the third information corresponding to the beam failure detection reference signal to a base station and informs the base station that a beam failure event occurs. Alternatively, after a beam failure event occurs for the CC1, the terminal selects a new reference signal in the candidate reference signal set corresponding to the CC1 and transmits the information of the new reference signal to the base station.

Since the beam correlation between the CC1 and the CC2 is relatively high. When a beam failure event occurs for the CC1, it is probable that a control channel beam fails in the CC2. One manner to recover the communication of the CC2 rapidly is implemented through the base station. For example, when the base station and the terminal recover the communication on the CC1, the TCI information (that is, the quasi co-location reference signal information) of a control channel of the CC2 is notified through a MAC-CE signaling or an RRC signaling in the CC1. However, in this manner, the CC2 cannot be recovered in the case where the overhead of the MAC-CE signaling is large, where the communication link of the CC2 is recovered slowly, and where the CC1 is unable to be recovered. According, from the fourth predetermined moment, at least one of the manners below is used.

In solution 1, a QCL reference signal that belongs to a CORESET in the CC2 and satisfies the quasi co-location relationship with abeam failure detection reference signal in the CC1 performs an update or activation action.

In solution 2, a QCL reference signal of a predetermined CORESET in the CC2 performs an update or activation action. For example, a QCL reference signal of a CORESET configured with a beam failure search space in the CC2 performs an update or activation action; alternatively, a QCL reference signal of a CORESET configured with a beam failure recovery CORESET in the CC2 performs an update or activation action.

The preceding solutions where a QCL reference signal of a CORESET in the CC2 performs an update or activation action from the fourth predetermined moment include the update manners below.

In update manner one, a quasi co-location reference signal that is in a CORESET in the CC2 and is related to a first-type quasi co-location parameter is acquired based on the reference signal indication information included in the third information corresponding to the CC1, and a quasi co-location reference signal that is in a CORESET in the CC2 and is related to a second-type quasi co-location parameter is acquired based on a third-type reference signal in the CC2.

In updating manner two, a quasi co-location reference signal that is in a CORESET in the CC2 and is related to a first-type quasi co-location parameter is acquired based on the reference signal indication information included in the third information corresponding to the CC1, and a quasi co-location reference signal that is in a CORESET in the CC2 and is related to a second-type quasi co-location parameter remains unchanged.

In updating manner two, a quasi co-location reference signal that is in a CORESET in the CC2 and is related to a first-type quasi co-location parameter and a quasi co-location reference signal that is in a CORESET in the CC2 and is related to a second-type quasi co-location parameter are each acquired based on the reference signal indication information included in the third information corresponding to the CC1.

In updating manner three, a quasi co-location reference signal that is in a CORESET in the CC2 and is related to a first-type quasi co-location parameter and a quasi co-location reference signal that is in a CORESET in the CC2 and is related to a second-type quasi co-location parameter are each acquired based on a third-type reference signal in the CC2.

Here the third-type reference signal corresponds to a reference signal included in the third information corresponding to the CC1: alternatively, the third-type reference signal belongs to a candidate reference signal set in the CC2; alternatively, the third-type reference signal is a reference signal of predetermined configuration.

Here a first-type quasi co-location parameter includes at least one of a spatial Rx parameter, a Doppler shift, or an average delay.

Here a second-type quasi co-location parameter includes at least one of a Doppler spread or a delay spread.

Here the fourth predetermined moment includes at least one of a moment after an A time domain symbol after the third information is transmitted; a moment after a B time domain symbol after the response information transmitted by the base station is received, where the response information corresponds to the response information of the third information transmitted by the terminal; a moment after a C time domain symbol after the successful completion of the beam failure recovery process of the CC1 is determined; or a moment after a D time domain symbol after control information is detected in a predetermined control channel resource. Here A, B, C, and D each satisfies at least one of the following characteristics: being an integer greater than or equal to 1, being a fixed value, or being acquired by the reported capability information.

The fifth predetermined moment may include one of the preceding moments. Moreover, the fourth predetermined moment and the fifth predetermined moment are the same moment or different moments.

At least one of A, B, C, or D is acquired based on at least one of a subcarrier spacing parameter $2^{\mu_1}$ corresponding to one BWP of the CC1, a subcarrier spacing parameter $2^{\mu_2}$ corresponding to one BWP of the CC2, or a ratio $2^{\mu_2-\mu_1}$ of a subcarrier spacing parameter corresponding to one BWP of the CC2 to a subcarrier spacing parameter corresponding to one BWP of the CC1.

One or more second-type frequency domain bandwidths corresponding to one first-type frequency domain bandwidth are determined based on at least one of the signaling information transmitted by the base station, the information reported by the terminal, the index of a CC where a first-type reference signal is located, the index of a CC where a second-type reference signal is located, or a band where the first-type frequency domain bandwidth is located.

For example, CCs in one serving cell group form one CC group. When a beam failure event occurs for one CC in one CC group, a QCL reference signal of a demodulation reference signal of a CORESET in this CC is updated or activated automatically. CCs in one CC group are located in one band; that is, the CCs are intra-band CCs. For example, two reference signals are included in a first-type reference signal set; one reference signal is located in the CC1; the other reference signal is located in the CC2; and when a beam failure event is detected based on the first-type reference signal set, a QCL reference signal of a demodulation reference signal of a CORESET in the CC1 and a QCL reference signal of a demodulation reference signal of a CORESET in the CC2 are updated or activated automatically. For example, when a beam failure event is detected based on a first-type reference signal set, one reference signal is selected from a second-type reference signal set; two reference signals are included in the second-type reference signal set, one reference signal is located in the CC3; the other reference signal is located in the CC4; and when a beam failure event is detected based on the first-type reference signal set, a QCL reference signal of a demodulation reference signal of a CORESET in the CC3 and a QCL reference signal of a demodulation reference signal of a CORESET in the CC4 are updated or activated automatically.

In the preceding description, a QCL reference signal of a demodulation reference signal of a CORESET in the CC2 is updated or activated automatically. A QCL reference signal of a demodulation reference signal of the PDSCH scheduled by the CORESET in the CC2 is acquired automatically based on the third information and/or a third reference signal.

One second-type frequency domain bandwidth may correspond to more than one first-type frequency domain bandwidth, as long as a QCL reference signal of a demodulation reference signal of the PDSCH scheduled by the CORESET in the CC2 is acquired automatically based on the third information and/or a third reference signal after a beam failure event is detected based on a beam failure detection reference signal corresponding to one first-type frequency domain bandwidth. Alternatively, it is stipulated that one second-type frequency domain bandwidth can correspond to only one first-type frequency domain bandwidth.

When a problem occurs for a downlink beam of the CC1, a problem may occur for an uplink beam of the CC1 and an uplink beam of the CC2. Accordingly, from the fifth predetermined moment, a spatial transmission filter of an uplink signal in the CC2 is determined based on the spatial transmission filter for transmitting the third information by the terminal. Here an uplink signal includes an uplink control channel signal, for example, a specific PUCCH, a scheduling-free PUSCH, an uplink sounding reference signal (SRS), or a scheduling request (SR) resource.

In step three, from a fourth predetermined moment to a moment when a first predetermined event occurs, a quasi co-location reference signal of a downlink signal in a second-type frequency domain bandwidth is acquired or updated based on the third information and/or a predetermined rule; and/or from a fifth predetermined moment to a moment when a second predetermined event occurs, a spatial transmission filter of an uplink signal in a second-type frequency domain bandwidth is acquired or updated based on the third information and/or the predetermined rule.

The first predetermined event includes one of receiving an update or activation signaling of a quasi co-location reference signal of a downlink control channel, receiving an update or activation signaling of a quasi co-location reference signal of the downlink control channel of the CC1, receiving an update or activation signaling of a quasi co-location reference signal of a downlink control channel after the beam failure response information of the CC1 is received, or receiving an update or activation signaling of a quasi co-location reference signal of the downlink control channel of the CC1 after the beam failure response information of the CC1 is received.

The second predetermined event includes one of receiving an update or activation signaling of the spatial relationship indication information of an uplink control channel after the beam failure response information of the CC1 is received or receiving an update or activation signaling of the spatial relationship indication information of the uplink control channel of the CC1 after the beam failure response information of the CC1 is received.

After the third information of the CC1 is transmitted, the response information corresponding to the third information is monitored in the beam failure recovery search space of the CC1 and the beam failure recovery search space of the CC2. As long as the response information is heard in any beam failure recovery search space of the two CCs, it is considered that the third information is transmitted successfully; the beam failure recovery timer corresponding to the third information is stopped; and/or the beam failure response information timer corresponding to the third information is stopped.

Function modules/units in all or part of the steps of the method, the system and the apparatus disclosed in the preceding description may be implemented as software, firmware, hardware or any appropriate combination thereof. In the hardware implementation, the division of the preceding function modules/units may not correspond to the division of physical components. For example, one physical component may have multiple functions, or one function or step may be performed jointly by several physical components. Some or all components may be implemented as software executed by a processor such as a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). The term computer storage media include volatile and nonvolatile as well as removable and non-removable media implemented in any method or technology for storage of information (such as computer-readable instructions, data structures, program modules or other data). The computer storage media include, but are not limited to, a random access memory (RAM), a read-only memory (ROM), an electrically erasable programmable read-only memory (EEPROM), a flash memory or another memory technology, a compact disc read-only memory (CD-ROM), a digital versatile disc (DVD) or another optical disc storage, a magnetic cassette, a magnetic tape, disk storage or another magnetic storage apparatus, or any other medium used to store the desired information and accessible by a computer. Additionally, the communication media generally include computer-readable instructions, data structures, program modules, or other data in carriers or in modulated data signals transported in other transport mechanisms and may include any information delivery medium.

What is claimed is:

1. A method for beam failure recovery, comprising: in response to a non-empty intersection existing between time domain resources corresponding to beam failure recovery processes of N frequency domain bandwidths,
    combining the beam failure recovery processes of the N frequency domain bandwidths into a single beam failure recovery process and performing the single beam failure recovery process;
    wherein N is an integer greater than 1 and a time domain resource corresponding to a beam failure recovery process of a frequency domain bandwidth of the N frequency domain bandwidths comprises a period from detecting a beam failure event to monitoring beam failure response information;

wherein combining the beam failure recovery processes of the N frequency domain bandwidths into the single beam failure recovery process and performing the single beam failure recovery process comprises: in response to requiring transmission of first information corresponding to one frequency domain bandwidth, determining a first frequency domain bandwidth set, and transmitting first information corresponding to the first frequency domain bandwidth set;

wherein a beam failure event occurs and has not been recovered successfully for each frequency domain bandwidth in the first frequency domain bandwidth set;

wherein the first information corresponding to the first frequency domain bandwidth set comprises first information corresponding to each frequency domain bandwidth in the first frequency domain bandwidth set; and wherein the first information corresponding to the each frequency domain bandwidth in the first frequency domain bandwidth set comprises an index of a component carrier (CC) or an index of a CC and indication information of a new reference signal selected from a candidate reference signal set corresponding to the each frequency domain bandwidth.

2. The method according to claim 1, wherein combining the beam failure recovery processes of the N frequency domain bandwidths into the single beam failure recovery process and performing the single beam failure recovery process further comprises at least one of:

selecting one beam failure request resource based on the first frequency domain bandwidth set, and transmitting the first information corresponding to the first frequency domain bandwidth set on the one beam failure request resource;

the first frequency domain bandwidth set comprises M frequency domain bandwidths selected from a second frequency domain bandwidth set, a beam failure event occurs and has not been recovered successfully for each frequency domain bandwidth in the second frequency domain bandwidth set, and M is an integer greater than or equal to 1 and smaller than or equal to N; or in response to receiving response information corresponding to one frequency domain bandwidth set, determining that a beam failure recovery process corresponding to the one frequency domain bandwidth set is successfully completed.

3. The method according to claim 2, satisfying at least one of the following characteristics:

transmitting the first information corresponding to the first frequency domain bandwidth set on the one beam failure request resource comprises: transmitting an information bit representing the first information corresponding to the first frequency domain bandwidth set on the one beam failure request resource;

selecting the M frequency domain bandwidths from the second frequency domain bandwidth set comprises selecting the M frequency domain bandwidths from the second frequency domain bandwidth set based on second information, wherein the second information comprises information about whether the second frequency domain bandwidth set comprises a special cell (SPcell).

4. The method according to claim 3, wherein selecting the M frequency domain bandwidths from the second frequency domain bandwidth set comprises:

in response to a beam failure event occurring in a primary cell (Pcell) and a beam failure event occurring in a secondary cell (Scell), selecting a beam failure recovery process of the Pcell;

wherein one cell corresponds to one frequency domain bandwidth.

5. The method according to claim 1, wherein a frequency domain bandwidth of the N frequency domain bandwidth whose first information has been transmitted satisfies the following characteristics:

in a period from a first predetermined moment after the first information of the frequency domain bandwidth is transmitted to a moment of occurrence of a predetermined event, a predetermined demodulation reference signal and a reference signal comprised in the first information of the frequency domain bandwidth satisfy a quasi co-location (QCL) relationship;

wherein the predetermined demodulation reference signal comprises: a demodulation reference signal of a control channel in a beam failure recovery search space of the frequency domain bandwidth; and wherein the predetermined event comprises:

receiving reconfiguration or activation information of a quasi co-location reference signal of the control channel of the frequency domain bandwidth;

wherein the first predetermined moment is acquired based on a subcarrier spacing of an active BWP in the frequency domain bandwidth.

6. The method according to claim 1, wherein the N frequency domain bandwidths satisfy the following characteristics:

a beam failure request resource corresponding to the N frequency domain bandwidths belongs to one frequency domain bandwidth;

wherein the beam failure request resource comprises at least one of: a Physical Random Access Channel (PRACH) resource, a physical uplink control channel (PUCCH) resource, a physical uplink shared channel (PUSCH) resource, a medium access control-control element (MAC-CE) signaling, or a scheduling request (SR) resource.

7. The method according to claim 1, further comprising:

in response to a non-empty intersection existing between time domain resources corresponding to beam failure recovery processes of N frequency domain bandwidths, simultaneously performing the beam failure recovery processes of the N frequency domain bandwidths;

wherein a maximum number of the beam failure recovery processes performed simultaneously is smaller than or equal to a predetermined value.

8. The method according to claim 1, satisfying the following characteristics:

one frequency domain bandwidth comprises one serving cell; or first information corresponding to the one serving cell comprises first information corresponding to one BWP in the one serving cell, wherein the first information corresponding to the one serving cell comprises reference signal indication information; wherein the one BWP comprises a BWP corresponding to a reference signal corresponding to the reference signal indication information comprised in the first information corresponding to the one serving cell.

9. The method according to claim 1, wherein the non-empty intersection existing among the time domain resources corresponding to the beam failure recovery processes of the N frequency domain bandwidths comprises at least one of:

in response to requiring transmission of first information corresponding to one frequency domain bandwidth, a beam failure recovery process of at least another frequency domain bandwidth of the N frequency domain bandwidths is being performed;

in response to requiring transmission of first information corresponding to one frequency domain bandwidth, beam failure response information of at least another frequency domain bandwidth of the N frequency domain bandwidths is being monitored; or in the intersection among the time domain resources corresponding to the beam failure recovery processes of the N frequency domain bandwidths, a beam failure event occurs and has not been recovered successfully for each frequency domain bandwidth in the N frequency domain bandwidths.

10. The method according to claim 1, further comprising:
determining whether a beam failure event occurs for each frequency domain bandwidth of the N frequency domain bandwidths by detecting a beam failure detection reference signal in a beam failure detection reference signal set corresponding to the each frequency domain bandwidth of the N frequency domain bandwidths, wherein different frequency domain bandwidths correspond to different beam failure detection reference signal sets.

11. A non-transitory computer-readable storage medium storing a computer program which, when executed by a processor, causes the processor to perform the method according to claim 1.

12. The method according to claim 1, further comprising determining the following information based on at least one of signaling information or a predetermined rule:

a correspondence relationship between one beam failure request resource and first information of E frequency domain bandwidths;

beam failure recovery parameter information in a case where a frequency domain bandwidth comprises beam failure recovery resource corresponding to first information of F frequency domain bandwidths;

wherein E and F are each an integer greater than 1;

wherein the beam failure request resource comprises at least one of: a PRACH resource, a PUCCH resource, a PUSCH resource, a MAC-CE resource, or an SR resource.

13. The method according to claim 12, wherein, in the case where the one frequency domain bandwidth comprises the beam failure recovery resource corresponding to the first information of the F frequency domain bandwidths, determining the beam failure recovery parameter information comprises:

determining that the F frequency domain bandwidths correspond to F sets of first-type beam failure recovery parameter information and F sets of second-type beam failure recovery parameter information;

wherein one beam failure recovery resource comprises a beam failure request resource;

wherein the first-type beam failure recovery parameter information comprises a maximum duration corresponding to a beam failure detection timer, and a maximum number of times corresponding to a beam failure detection counter; and wherein the second-type beam failure recovery parameter information comprises a candidate reference signal set.

14. The method according to claim 12, satisfying the following characteristics:

the first information of the F frequency domain bandwidths comprises one of: an index of a CC, an index of a CC and indication information of a new reference signal selected from a candidate reference signal set corresponding to a frequency domain bandwidth of the F frequency domain bandwidths; beam failure request information; or information transmitted in response to detecting a beam failure event through detecting one reference signal set corresponding to a frequency domain bandwidth of the F frequency domain bandwidths;

a frequency domain bandwidth of the F frequency domain bandwidths comprises the CC.

15. An apparatus for beam failure recovery, comprising a processor and a memory for storing execution instructions that when executed by the processor cause the processor to perform steps in following modules:

a first beam failure recovery module configured to, in response to a non-empty intersection existing among time domain resources corresponding to beam failure recovery processes of N frequency domain bandwidths, combine the beam failure recovery processes of the N frequency domain bandwidths into a single beam failure recovery process and performing the single beam failure recovery process;

wherein N is an integer greater than 1 and a time domain resource corresponding to a beam failure recovery process of a frequency domain bandwidth of the N frequency domain bandwidths comprises a period from detecting a beam failure event to monitoring beam failure response information;

wherein combining the beam failure recovery processes of the N frequency domain bandwidths into the single beam failure recovery process and performing the single beam failure recovery process comprises: in response to requiring transmission of first information corresponding to one frequency domain bandwidth, determining a first frequency domain bandwidth set, and transmitting first information corresponding to the first frequency domain bandwidth set;

wherein a beam failure event occurs and has not been recovered successfully for each frequency domain bandwidth in the first frequency domain bandwidth set;

wherein the first information corresponding to the first frequency domain bandwidth set comprises first information corresponding to each frequency domain bandwidth in the first frequency domain bandwidth set; and wherein the first information corresponding to the each frequency domain bandwidth in the first frequency domain bandwidth set comprises an index of a component carrier (CC) or an index of a CC and indication information of a new reference signal selected from a candidate reference signal set corresponding to the each frequency domain bandwidth.

16. The apparatus according to claim 15, wherein combining the beam failure recovery processes of the N frequency domain bandwidths into the single beam failure recovery process and performing the single beam failure recovery process further comprises at least one of:

selecting one beam failure request resource based on the first frequency domain bandwidth set, and transmitting the first information corresponding to the first frequency domain bandwidth set on the one beam failure request resource;

the first frequency domain bandwidth set comprises M frequency domain bandwidths selected from a second frequency domain bandwidth set, a beam failure event occurs and has not been recovered successfully for each frequency domain bandwidth in the second frequency domain bandwidth set, and M is an integer greater than or equal to 1 and smaller than or equal to N; or in response to receiving response information corresponding to one frequency domain bandwidth set, determining that a beam failure recovery process corresponding to the one frequency domain bandwidth set is successfully completed.

17. The apparatus according to claim 15, further comprising an information determination module configured to determine the following information based on at least one of signaling information or a predetermined rule:
a correspondence relationship between one beam failure request resource and first information of E frequency domain bandwidths;
beam failure recovery parameter information in a case where a frequency domain bandwidth comprises beam failure recovery resources corresponding to first information of F frequency domain bandwidths;
wherein E and F are each an integer greater than 1; and
wherein the beam failure request resource comprises at least one of: a PRACH resource, a PUCCH resource, a PUSCH resource, a MAC-CE resource, or an SR resource.

18. The apparatus according to claim 15, wherein a frequency domain bandwidth of the N frequency domain bandwidth whose first information has been transmitted satisfies the following characteristics:
in a period from a first predetermined moment after the first information of the frequency domain bandwidth is transmitted to a moment of occurrence of a predetermined event, a predetermined demodulation reference signal and a reference signal comprised in the first information of the frequency domain bandwidth satisfy a quasi co-location (QCL) relationship;
wherein the predetermined demodulation reference signal comprises: a demodulation reference signal of a control channel in a beam failure recovery search space of the frequency domain bandwidth; and
wherein the predetermined event comprises:
receiving reconfiguration or activation information of a quasi co-location reference signal of the control channel of the frequency domain bandwidth;
wherein the first predetermined moment is acquired based on a subcarrier spacing of an active BWP in the frequency domain bandwidth.

19. The apparatus according to claim 15, wherein the N frequency domain bandwidths satisfy the following characteristics:
a beam failure request resource corresponding to the N frequency domain bandwidths belongs to one frequency domain bandwidth;
wherein the beam failure request resource comprises at least one of: a Physical Random Access Channel (PRACH) resource, a physical uplink control channel (PUCCH) resource, a physical uplink shared channel (PUSCH) resource, a medium access control-control element (MAC-CE) signaling, or a scheduling request (SR) resource.

20. The apparatus according to claim 15, further comprising determining the following information based on at least one of signaling information or a predetermined rule:
a correspondence relationship between one beam failure request resource and first information of E frequency domain bandwidths,
beam failure recovery parameter information in a case where a frequency domain bandwidth comprises beam failure recovery resource corresponding to first information of F frequency domain bandwidths;
wherein each of E and F is an integer greater than 1;
wherein the beam failure request resource comprises at least one of: a PRACH resource, a PUCCH resource, a PUSCH resource, a MAC-CE resource, or an SR resource;
wherein, in the case where the one frequency domain bandwidth comprises the beam failure recovery resource corresponding to the first information of the F frequency domain bandwidths, determining the beam failure recovery parameter information comprises:
determining that the F frequency domain bandwidths correspond to F sets of first-type beam failure recovery parameter information and F sets of second-type beam failure recovery parameter information;
wherein one beam failure recovery resource comprises a beam failure request resource;
wherein the first-type beam failure recovery parameter information comprises a maximum duration corresponding to a beam failure detection timer, and a maximum number of times corresponding to a beam failure detection counter;
wherein the second-type beam failure recovery parameter information comprises a candidate reference signal set;
wherein the first information of the F frequency domain bandwidths comprises one of: an index of a CC, an index of a CC and indication information of a new reference signal selected from a candidate reference signal set corresponding to a frequency domain bandwidth of the F frequency domain bandwidths; beam failure request information; or information transmitted in response to detecting a beam failure event through detecting one reference signal set corresponding to a frequency domain bandwidth of the F frequency domain bandwidths; and
wherein a frequency domain bandwidth of the F frequency domain bandwidths comprises the CC.

* * * * *